(12) United States Patent
Marcel et al.

(10) Patent No.: US 12,546,287 B2
(45) Date of Patent: Feb. 10, 2026

(54) SOUND VIBRATION AND FRICTION LIMITING TURBINE GENERATOR GYROSCOPE METHOD AND APPARATUS

(71) Applicant: Airborne Motorworks Inc., Veradale, WA (US)

(72) Inventors: Jesse Antoine Marcel, Veradale, WA (US); Jeffrey Scott Chimenti, The Woodlands, TX (US)

(73) Assignee: Airborne Motorworks Inc., Veradale, WA (US)

( * ) Notice: Subject to any disclaimer, the term of this patent is extended or adjusted under 35 U.S.C. 154(b) by 0 days.

(21) Appl. No.: 18/375,516

(22) Filed: Sep. 30, 2023

(65) Prior Publication Data
US 2024/0026860 A1    Jan. 25, 2024

Related U.S. Application Data

(63) Continuation-in-part of application No. 17/991,843, filed on Nov. 22, 2022, now abandoned, which is a
(Continued)

(51) Int. Cl.
*F03D 9/00* (2016.01)
*F03D 7/02* (2006.01)
(Continued)

(52) U.S. Cl.
CPC ............. *F03D 9/25* (2016.05); *F03D 7/0236* (2013.01); *F03D 7/04* (2013.01);
(Continued)

(58) Field of Classification Search
CPC . F03D 9/25; F03D 7/0236; F03D 7/04; F03D 1/025; F03D 1/0606; F03D 7/0224;
(Continued)

(56) References Cited

U.S. PATENT DOCUMENTS

| 2,279,690 A | 4/1942 | Lindsey |
| 2,945,138 A | 7/1960 | Strang |

(Continued)

FOREIGN PATENT DOCUMENTS

| CN | 102166928 | 8/2011 |
| CN | 202326019 U | 7/2012 |

(Continued)

OTHER PUBLICATIONS

International Search Report and Written Opinion of the International Searching Authority completed Oct. 30, 2024, in International Patent Application No. PCT/US24/48112, 15 pages.

(Continued)

*Primary Examiner* — Julio C. Gonzalez

(57) ABSTRACT

A friction limiting turbine gyroscope is a compact and efficient means to convert the energy of a moving fluid into electrical energy. The gyroscope's flywheel rotates when a fluid passes through its spokes while magnets located along the perimeter act upon proximate movable field coils to produce electricity. The spokes of the flywheel are optimized for the flow and density of the fluid with the ability to trans mutate using shaped memory alloys as well as rotate about their center of pressure allowing the flywheel to capture more of the energy from the fluid passing over their surfaces in all conditions. Mechanical energy losses are reduced because of the inherent stabilizing effects created by the gyroscope. Because of the stabilization, a magnetic bearing field effectively supports the gyroscope eliminating mechanical interference in rotation.

17 Claims, 19 Drawing Sheets

Related U.S. Application Data continuation of application No. 17/187,869, filed on Feb. 28, 2021, now Pat. No. 11,506,178.

(60) Provisional application No. 62/983,547, filed on Feb. 28, 2020.

(51) Int. Cl.
  *F03D 7/04* (2006.01)
  *F03D 9/25* (2016.01)

(52) U.S. Cl.
  CPC ... *F05B 2240/511* (2013.01); *F05B 2260/305* (2013.01); *F05B 2270/101* (2013.01)

(58) Field of Classification Search
  CPC .......... F05B 2240/511; F05B 2260/305; F05B 2270/101
  See application file for complete search history.

(56) References Cited

U.S. PATENT DOCUMENTS

| | | | |
|---|---|---|---|
| 3,033,492 A | 5/1962 | Rowe | |
| 3,142,455 A | 7/1964 | Wilford | |
| 3,265,329 A | 8/1966 | Postelson | |
| 3,327,538 A | 6/1967 | Krupick et al. | |
| 3,396,391 A | 8/1968 | Anderson et al. | |
| 3,556,239 A * | 1/1971 | Spahn | B60K 17/04 180/2.2 |
| 3,845,995 A | 11/1974 | Wehde | |
| 3,972,490 A | 8/1976 | Zimmermann et al. | |
| 3,991,487 A | 11/1976 | Bede | |
| 4,046,335 A | 9/1977 | Osberger | |
| 4,459,087 A | 7/1984 | Barge | |
| 4,720,640 A | 1/1988 | Anderson et al. | |
| 4,953,811 A | 9/1990 | Smith | |
| 5,331,245 A | 7/1994 | Burgbacher et al. | |
| 5,454,531 A | 10/1995 | Melkuti | |
| 5,496,258 A | 3/1996 | Anninos et al. | |
| 5,505,594 A | 4/1996 | Sheehan | |
| 5,514,923 A | 5/1996 | Gossler et al. | |
| 5,601,346 A | 2/1997 | Lustenberger et al. | |
| 5,653,404 A | 8/1997 | Ploshkin | |
| 5,786,645 A | 7/1998 | Obidniak | |
| 5,925,952 A | 7/1999 | Bichler et al. | |
| 6,000,915 A | 12/1999 | Hartman | |
| 6,254,359 B1 | 7/2001 | Aber | |
| 6,270,038 B1 | 8/2001 | Cycon et al. | |
| 6,431,494 B1 | 8/2002 | Kinkead et al. | |
| 6,465,902 B1 * | 10/2002 | Beauchamp | F03G 7/06143 290/55 |
| 6,616,094 B2 | 9/2003 | Illingworth | |
| 6,919,663 B2 | 7/2005 | Iles-Klumpner | |
| 6,921,042 B1 | 7/2005 | Goodzeit et al. | |
| 7,032,861 B2 | 4/2006 | Sanders, Jr. et al. | |
| 7,109,671 B2 | 9/2006 | Bedini | |
| 7,148,596 B2 | 12/2006 | Minato et al. | |
| 7,152,301 B2 | 12/2006 | Rittmeyer | |
| 7,825,554 B2 | 11/2010 | Bastian, II et al. | |
| 7,874,513 B1 | 1/2011 | Smith | |
| 8,022,567 B2 * | 9/2011 | Davis | F03B 3/128 290/54 |
| 8,083,557 B2 | 12/2011 | Sullivan | |
| 8,698,365 B2 | 4/2014 | Hull et al. | |
| 8,752,787 B2 | 6/2014 | Ruan et al. | |
| 8,761,961 B2 | 6/2014 | Lee et al. | |
| 9,425,660 B2 | 8/2016 | Scroggins | |
| 9,649,242 B2 | 5/2017 | Chiu et al. | |
| 9,815,552 B1 | 11/2017 | Welsh | |
| 10,040,544 B2 | 8/2018 | Marcel | |
| 10,084,365 B1 | 9/2018 | Pandya | |
| 10,107,294 B2 | 10/2018 | Jang | |
| 10,144,507 B2 | 12/2018 | Chretien | |
| 10,432,079 B2 | 10/2019 | Ny | |
| 10,473,107 B1 | 11/2019 | Newton et al. | |
| 10,523,074 B2 | 12/2019 | Linares | |
| 10,676,180 B2 | 6/2020 | Marcel | |
| 2002/0105241 A1 | 8/2002 | Carroll et al. | |
| 2003/0085319 A1 | 5/2003 | Wagner et al. | |
| 2004/0020185 A1 | 2/2004 | Brouillette et al. | |
| 2004/0061022 A1 | 4/2004 | Paul | |
| 2004/0094662 A1 | 5/2004 | Sanders, Jr. et al. | |
| 2005/0188701 A1 | 9/2005 | Kung et al. | |
| 2005/0269889 A1 | 12/2005 | Tessier et al. | |
| 2006/0001629 A1 | 1/2006 | Obinata | |
| 2006/0016929 A1 | 1/2006 | Mohr | |
| 2006/0038461 A1 | 2/2006 | Gabrys | |
| 2006/0049304 A1 | 3/2006 | Sanders, Jr. et al. | |
| 2006/0070646 A1 | 4/2006 | Denman | |
| 2007/0188906 A1 | 8/2007 | Ho et al. | |
| 2007/0210730 A1 | 9/2007 | Lee | |
| 2007/0237656 A1 | 10/2007 | Pipkorn et al. | |
| 2008/0042504 A1 | 2/2008 | Thibodeau et al. | |
| 2008/0150294 A1 | 6/2008 | Jones | |
| 2008/0223979 A1 | 9/2008 | Schlunke | |
| 2010/0001143 A1 | 1/2010 | Bojiuc | |
| 2010/0084938 A1 | 4/2010 | Palmer et al. | |
| 2010/0090440 A1 | 4/2010 | Reichstetter et al. | |
| 2010/0282528 A1 | 11/2010 | Palti | |
| 2010/0301608 A1 | 12/2010 | Rush | |
| 2010/0307290 A1 | 12/2010 | Porfiropoulos | |
| 2011/0018504 A1 | 1/2011 | Patterson | |
| 2011/0025067 A1 | 2/2011 | Cipriani | |
| 2011/0031760 A1 | 2/2011 | Lugg | |
| 2011/0178711 A1 | 7/2011 | Christoph | |
| 2011/0285141 A1 | 11/2011 | Groendahl et al. | |
| 2011/0291513 A1 | 12/2011 | Schaefer | |
| 2011/0304232 A1 | 12/2011 | Rush | |
| 2012/0056040 A1 | 3/2012 | Brotherton-Ratcliffe et al. | |
| 2012/0091832 A1 | 4/2012 | Soderberg | |
| 2012/0104155 A1 | 5/2012 | Yarger | |
| 2012/0112461 A1 | 5/2012 | Saluccio | |
| 2012/0267974 A1 | 10/2012 | Lebenbom | |
| 2013/0020429 A1 | 1/2013 | Kroo | |
| 2013/0093295 A1 | 4/2013 | Rabal | |
| 2013/0251525 A1 | 9/2013 | Saiz | |
| 2013/0305850 A1 | 11/2013 | Davis | |
| 2014/0049218 A1 | 2/2014 | Morand et al. | |
| 2014/0158816 A1 | 6/2014 | DeLorean | |
| 2014/0180184 A1 | 6/2014 | Duguid | |
| 2014/0260714 A1 | 9/2014 | Vallery et al. | |
| 2015/0091480 A1 | 4/2015 | Kischka et al. | |
| 2015/0149000 A1 | 5/2015 | Rischmuller et al. | |
| 2015/0188400 A1 | 7/2015 | Kemp et al. | |
| 2015/0209212 A1 | 7/2015 | Duguid | |
| 2015/0226086 A1 | 8/2015 | Samuelson | |
| 2016/0008206 A1 | 1/2016 | Devanaboyina | |
| 2016/0017618 A1 | 1/2016 | White et al. | |
| 2016/0049854 A1 | 2/2016 | Ny | |
| 2016/0152327 A1 | 6/2016 | Bertels | |
| 2016/0207625 A1 | 7/2016 | Judas et al. | |
| 2016/0325829 A1 | 11/2016 | Ahn et al. | |
| 2017/0073065 A1 | 3/2017 | Von Novak et al. | |
| 2017/0073070 A1 | 3/2017 | Xing | |
| 2017/0104385 A1 * | 4/2017 | Salamon | B64C 11/12 |
| 2017/0320564 A1 | 11/2017 | Kuzikov | |
| 2017/0320598 A1 | 11/2017 | Bushroe | |
| 2017/0335821 A1 | 11/2017 | Ohya et al. | |
| 2017/0361930 A1 | 12/2017 | Choi et al. | |
| 2018/0034353 A1 | 2/2018 | Gieras et al. | |
| 2018/0112675 A1 | 4/2018 | Neff et al. | |
| 2018/0166945 A1 | 6/2018 | Colavincenzo et al. | |
| 2018/0205279 A1 | 7/2018 | Linares | |
| 2018/0257793 A1 | 9/2018 | Ehinger | |
| 2018/0370623 A1 | 12/2018 | Globerman et al. | |
| 2019/0256191 A1 | 8/2019 | Suzuki et al. | |
| 2019/0300165 A1 | 10/2019 | Marcel et al. | |
| 2019/0309961 A1 | 10/2019 | Suarez et al. | |
| 2020/0140102 A1 | 5/2020 | Marcel et al. | |
| 2020/0230013 A1 | 7/2020 | Marcel et al. | |
| 2020/0358344 A1 | 11/2020 | Marcel et al. | |
| 2021/0277870 A1 | 9/2021 | Marcel et al. | |
| 2021/0403155 A1 | 12/2021 | Neiser | |
| 2022/0063820 A1 | 3/2022 | Uruma et al. | |

(56) References Cited

U.S. PATENT DOCUMENTS

| | | | |
|---|---|---|---|
| 2022/0080623 | A1 | 3/2022 | Schreiber |
| 2022/0380029 | A1 | 12/2022 | Marcel et al. |
| 2023/0113569 | A1 | 4/2023 | Marcel |
| 2024/0026860 | A1 | 1/2024 | Marcel et al. |

FOREIGN PATENT DOCUMENTS

| | | | |
|---|---|---|---|
| CN | 104316038 | | 1/2015 |
| CN | 204165558 | U | 2/2015 |
| CN | 104980001 | | 10/2015 |
| CN | 205372860 | U | 7/2016 |
| CN | 106516127 | | 3/2017 |
| CN | 111023462 | | 4/2020 |
| DE | 19842543 | | 5/1999 |
| EP | 2319796 | | 5/2011 |
| EP | 2514400 | | 10/2012 |
| EP | 2594477 | | 5/2013 |
| EP | 2610176 | | 7/2013 |
| EP | 2896933 | | 7/2015 |
| EP | 3296199 | | 3/2018 |
| JP | 47-15011 | | 5/1972 |
| JP | 3029792 | | 2/2000 |
| JP | 2006-21552 | | 1/2006 |
| JP | 2009-544265 | | 12/2009 |
| JP | 2010-88271 | | 4/2010 |
| JP | 2011-125400 | | 6/2011 |
| JP | 2013-505697 | | 2/2013 |
| JP | 2013-139247 | | 7/2013 |
| JP | 2015-135328 | | 7/2015 |
| JP | 2018-507010 | | 3/2018 |
| KR | 10-2016-0131631 | | 11/2016 |
| RU | 2321765 | | 4/2008 |
| RU | 2333866 | C2 | 9/2008 |
| RU | 2009134950 | A | 3/2011 |
| RU | 109740 | U1 | 10/2011 |
| RU | 112152 | U1 | 1/2012 |
| RU | 2527248 | | 8/2014 |
| RU | 2538737 | | 1/2015 |
| SU | 1211449 | | 2/1986 |
| WO | 2008/006614 | | 1/2008 |
| WO | 2009/093181 | | 7/2009 |
| WO | 2011/034336 | | 3/2011 |
| WO | 2013098736 | | 7/2013 |
| WO | 2016/153580 | | 9/2016 |
| WO | 2016195491 | | 12/2016 |
| WO | 2017/030509 | | 2/2017 |
| WO | 2019/086293 | | 5/2019 |
| WO | 2020/023977 | | 1/2020 |

OTHER PUBLICATIONS

International Search Report and Written Opinion of the International Searching Authority completed Oct. 12, 2022, in International Patent Application No. PCT/US22/37944, 6 pages.
Extended European Search Report dated Oct. 26, 2022, in European Patent Application No. 20773559.8, 6 pages.
Supplementary European Search Report completed Jan. 21, 2024, in European Patent Application No. 21760731, 3 pages.
International Search Report and Written Opinion of the International Searching Authority completed Jul. 8, 2024, in International Patent Application No. PCT/US24/26070, 13 pages.
Extended European Search Report dated Mar. 25, 2022, in European Patent Application No. 19840606.8, 12 pages.
Extended European Search Report dated Apr. 22, 2022, in European Patent Application No. 19875012.7, 9 pages.
Extended European Search Report dated Sep. 23, 2022, in European Patent Application No. 20741708.0, 10 pages.
International Search Report and Written Opinion of the International Searching Authority completed Aug. 28, 2016, in International Patent Application No. PCT/US16/12073, 12 pages.
International Search Report and Written Opinion of the International Searching Authority completed Jul. 12, 2019, in International Patent Application No. PCT/US19/24696, 6 pages.
International Search Report and Written Opinion of the International Searching Authority completed Oct. 30, 2019, in International Patent Application No. PCT/US19/43995, 6 pages.
International Search Report and Written Opinion of the International Searching Authority completed May 12, 2020, in International Patent Application No. PCT/US2019/048191, 7 pages.
International Search Report and Written Opinion of the International Searching Authority completed Apr. 17, 2020, in International Patent Application No. PCT/US2020/014491, 7 pages.
International Search Report and Written Opinion of the International Searching Authority completed Jun. 8, 2020, in International Patent Application No. PCT/US20/23676, 9 pages.
Extended European Search Report dated Nov. 25, 2021, in European Patent Application No. 19774564.9, 11 pages.
International Search Report and Written Opinion of the International Searching Authority completed Dec. 17, 2021, in International Patent Application No. PCT/US21/54041, 6 pages.
International Preliminary Report on Patentability dated Oct. 8, 2020, in International Patent Application No. PCT/US19/24696, 6 pages.
International Search Report and Written Opinion of the International Searching Authority completed Jun. 10, 2021, in International Patent Application No. PCT/US21/20174, 8 pages.

* cited by examiner

SOUND VIBRATION AND FRICTION LIMITING TURBINE GENERATOR GYROSCOPE METHOD AND APPARATUS

PRIORITY CLAIM

This application is a continuation-in-part of U.S. patent application Ser. No. 17/991,843 filed Nov. 22, 2022; which is a continuation of U.S. patent application Ser. No. 17/187,869 filed Feb. 28, 2021; which claims priority from U.S. Provisional Patent Application No. 62/983,547 filed Feb. 28, 2020, the contents of which are incorporated herein by reference in their entirety.

FIELD OF THE INVENTION

The invention relates to the field of electric propulsion systems used for propelling vertical takeoff and landing (VTOL) or very short takeoff and landing (VSTOL) air vehicles. More specifically, the invention comprises a friction limiting turbine gyroscope that is a compact and efficient means to convert the energy of a moving fluid into electrical energy for use in powering VTOL/VSTOL aircraft.

BACKGROUND OF THE INVENTION

Turbine generators convert the kinetic energy of flowing gases or liquids into electrical energy by liberating electrons from field coils. Typically, in a wind turbine example, wind acting on propeller blades turn a gearbox that spins a motor. While effective, currently used configurations tend to lose energy through gearbox and bearing assemblies. In addition, any instabilities in the turbine can cause undo wear on its components and in extreme conditions the turbine must be dampened or frozen in place to protect it from damage. To capture energy, the generators tend to be large and complex.

Therefore, there is a need for a compact, self-stabilizing, and efficient turbine gyroscope design that converts a higher percentage of the energy from the flow of the propelling fluid to electrical energy than is afforded in current designs. This is accomplished by limiting mechanical losses and using a more efficient spoke/blade flywheel/rotor. Because the invention is a novel gyroscope design, the inherent stabilizing effects created by the gyroscope reduces the stresses put upon the invention and its supports/bearings allowing for the viability of magnetic type roller bearings. A more efficient and optimal spoke/blade design is accomplished through a method that allows for the transmutation of the cross-section of the spokes/blades to expand or contract. The spokes/blades also have the ability to rotate about their center of pressure allowing the flywheel to capture more of the energy from the fluid passing over their surfaces in all conditions. The invention is more compact than current designs and can be more easily placed in or close to urban locations. As an example, the invention could be placed on the top of a high-rise building.

SUMMARY OF THE INVENTION

A friction limiting turbine gyroscope is assembled from a horizontally oriented gyroscope flywheel integrating aerodynamically shaped spokes that rotate the gyroscope when a fluid flow (for example air, gas or liquid) over them. The spokes contain an inner spar that can expand or contract through the use of a flexible composites containing shaped memory alloys that alter their shape when an electrical current is introduced. In alternate embodiments, the inner spar could be made to expand by introducing compressed gases, or by electromechanical servomechanism. The blades preferably have a flexible skin that that can expand or contract with the changes in the spar height and integrate shaped memory alloys to create the desired surface shape. The shape of the blades may adjust for changes in speed and density of the incoming propelling fluid. In addition, the spokes/blades are rotatable about their center of pressure through the actuation of a servomechanism. A central computer monitors the fluid changes to make the changes necessary to capture the most energy possible.

To convert the rotation of the flywheel to electrical energy, permanent magnets are integrated along its perimeter with proximately located field coils to convert the flywheel's ration to electrical energy. The mass of the permanent magnets also serves to amplify angular momentum of the flywheel creating stronger gyroscopic inertia. For optimal tuning of the turbine generator gyroscope, the distance between the field coils and the flywheel's permanent magnets can be altered to optimize energy generation in varied environmental conditions, for example, further away in low wind or closer in high wind. Because of the gyroscopic stabilizing effect, the invention can easily be supported by a magnetic bearing field eliminating mechanical stress and energy loss due to friction. In extremely low energy situations (for example, slow-moving wind), a portion of the field coils can be energized with phasing electricity to turn a portion of the generator into a motor. By energizing a small number of field coils, inertia can be conserved and create a net positive energy output.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The terminology used herein is for describing particular embodiments only and is not intended to be limiting for the invention. As used herein, the term "and/or" includes any and all combinations of one or more of the associated listed items. As used herein, the singular forms "a," "an" and "the" are intended to include the plural forms as well as the singular forms, unless the context clearly indicates otherwise. It will be further understood that the terms "comprises" and/or 'comprising' when used in this specification, specify the presence of stated features, steps, operations, elements, and/or components, but do not preclude the addition of one or more other features, steps, operations, elements, components, and/or groups thereof.

Unless otherwise defined, all terms used herein, including technical and scientific terms, have the same meaning as commonly understood by one having ordinary skill in the art to which the invention belongs. It will be further understood that terms, such as those defined in commonly used dictionaries, should be interpreted as having a meaning that is consistent with their meaning in the one context of the relevant art and the present disclosure and will not be interpreted in an idealized or overly formal sense unless expressly so defined, herein.

In describing the invention, it will be understood that several techniques and steps are disclosed. Each of these has individual benefit and each can also be used in conjunction with one or more (or in some cases all) of the other disclosed techniques. Accordingly, for the sake of clarity, this description will refrain from repeating every possible combination of the individual steps in an unnecessary fashion. Nevertheless, the specification and claims should be read with the understanding that such combination are entirely within the scope of the invention and the claims.

New friction limiting turbine generator gyroscope method and apparatus are discussed herein. In the following description, for the purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 1:
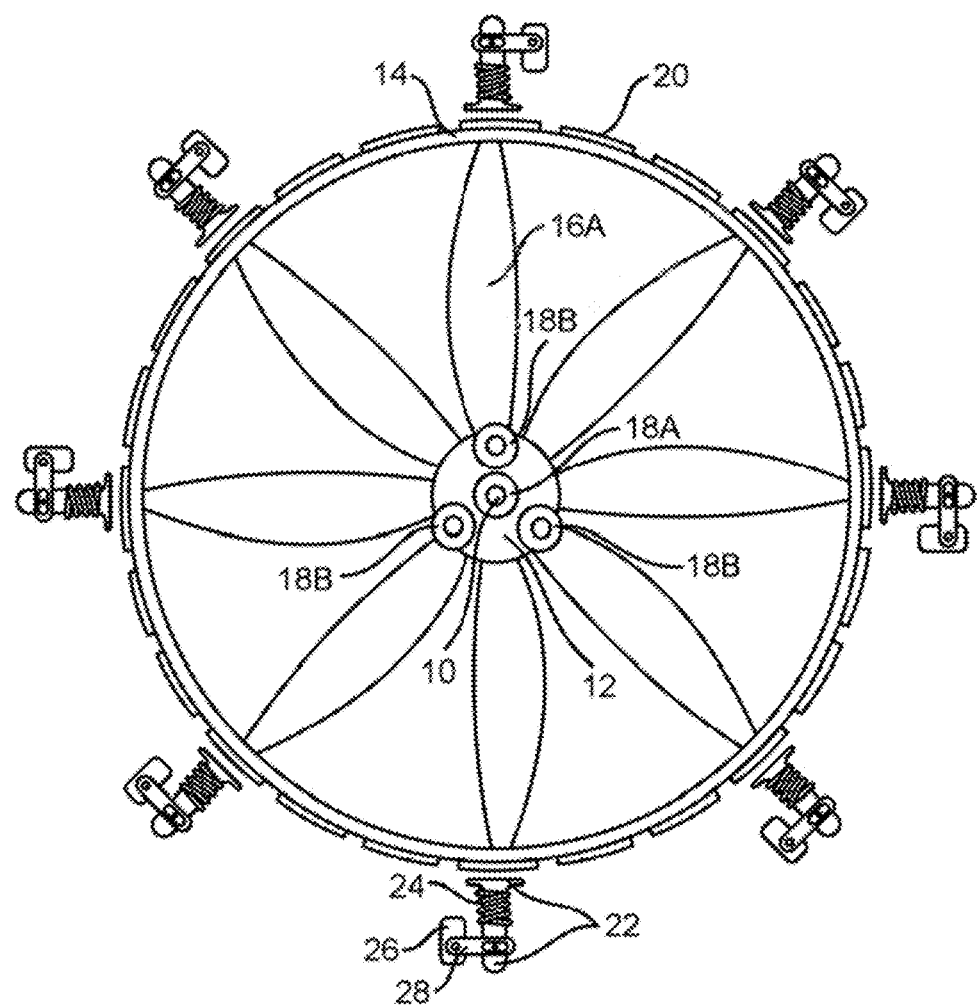
FIG. 1 shows the front view of a friction limiting turbine generator gyroscope of an embodiment of the present invention.

The present invention will now be described by referencing the appended figures representing preferred and alternative embodiments. FIG. 1 depicts a front view of elements that may comprise a new friction limiting turbine generator gyroscope device (the "device") according to various embodiments of the present invention. As shown with reference to FIGS. 1 and 2, in preferred embodiments, the general assembly front and side cross-section contains each of the elements of the device configured with at least one central gyroscope flywheel composed of a perimeter ring 14 with a central hub 12 and supported by axle and a plurality of rotatable spokes 16A, which may be made of lightweight composite, aluminum, or another suitable material. The peripheral ring 14 is configured to accept a plurality of permanent magnets 20 along the flywheel's exterior perimeter. The magnets can be glued in place with or without additional means to keep the magnets in place when the flywheel spins, not depicted in drawings.

In certain embodiments, a plurality of vertical protrusions separates a plurality of magnets to split the surface area of the gyroscope's perimeter equally. The magnets turn the flywheel into the armature of a turbine generator gyroscope. Magnets are acted upon by an external stator containing a plurality of stator tooths 22 wrapped by a plurality of field coils 24 to produce electricity. The field coils are individually connected to a plurality of voltage regulators allowing them to operate independent from each other. In low energy situations, for example low wind, phasing energy can be sent to a select number of field coils to maintain inertia creating net positive energy production. The tooths and field coils are preferably connected to a servomechanism 26 by a control arm 28 in such a manner that their distance from the magnets on the flywheel ring can be increased or reduced based upon the amount of energy passing through the spokes. If the flow is strong, the stator tooths are moved in closer; if the flow is weak, then the stator tooths are moved further out to lessen the drag on the gyroscope's flywheel magnets.

The central hub 12 is configured to accept a central axle 10 with end points 10A, that limit unwanted horizontal movements of the invention because end points touch against the surrounding support structure, not shown. The axle is supported by a magnetic field generated by a plurality of permanent magnets 18A located on the axle with a plurality of countering permanent magnets locating in the inventions supporting structure 18B. The magnetic fields on the axle's magnets oppose the magnetic fields in the supporting structures magnets causing the invention to float in a magnetic field. The ends of the axle serve to limit horizontal motion and precession caused by the gyroscope, allowing the invention to spin with very little friction. The flywheel creates gyroscopic inertia that limits the strain put on the magnetic bearing to increase its effectiveness at keeping the invention centered and balanced.

Figure 2:
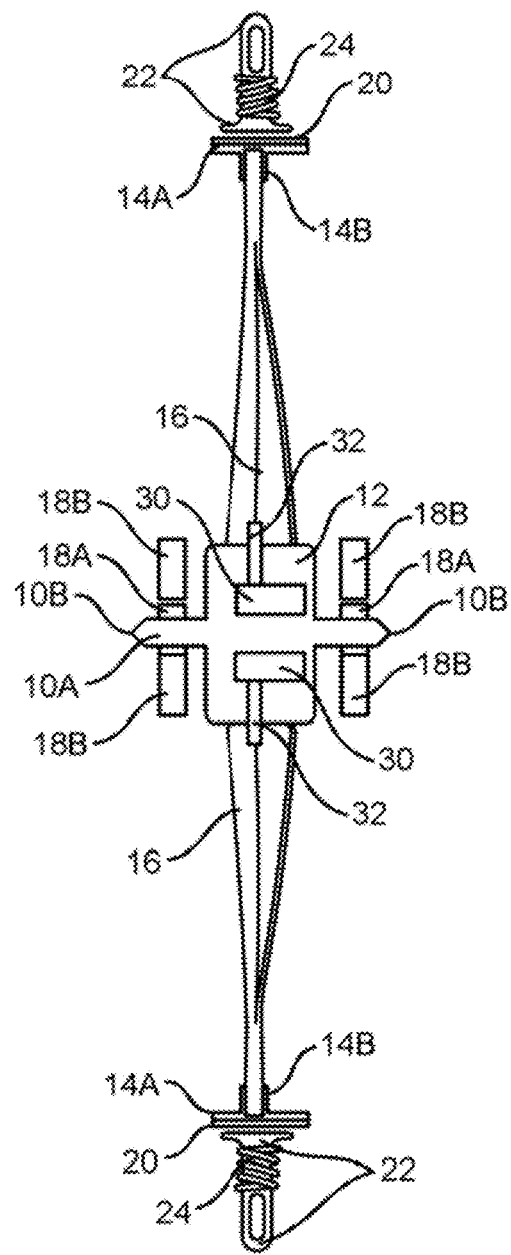
FIG. 2 shows a side cross-section view of a friction limiting turbine generator gyroscope of an embodiment of the present invention.
Figure 3:
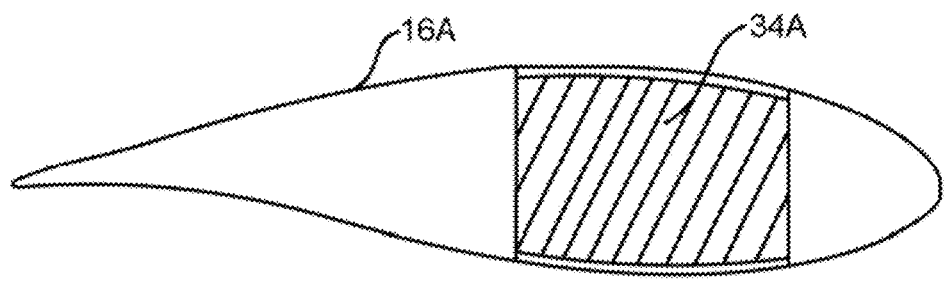
FIG. 3 shows a cross-section of the flywheel blades with a small cross-section with a contracted spar of an embodiment of the present invention.

As shown with reference to FIGS. 1-3, spokes/blades 16 are made from a composite material containing shaped memory alloys that when acted upon by an electrical current can change their shape. As shown with reference to FIGS. 3-4, a central spar 34A and 34B is also made from a composite that contains shaped memory alloys that allows the spar to change its shape from a thin cross-section 34A to a thicker cross-section 34B to take advantage of variable speeds and densities of the fluids that pass over the spokes/blades. The skin's shaped memory alloys work in conjunction with the spar to maintain the desired airfoil. A computer monitoring device constantly monitors the incoming fluid and adjusts the spokes/blade to extract the maximum amount energy possible from the moving fluids. As described with reference to FIG. 2, the blades are pivotably carried at both of its ends around a support shaft with bearing 14B receiving the outer support shaft with an additional bearing located in the hub, not shown, supporting the inner shaft.

At times when there is only slight movement in the fluid passing over the flywheel spokes/blades, phasing electrical current can be sent to a plurality of the stator tooths and field coils, which can be used to propel the flywheel to help maintain inertia. Only the minimum number of coils necessary to keep the flywheel spinning would be utilized. If there is no movement in propelling gases to rotate the flywheel then no field coils would be energized.

Figure 5:
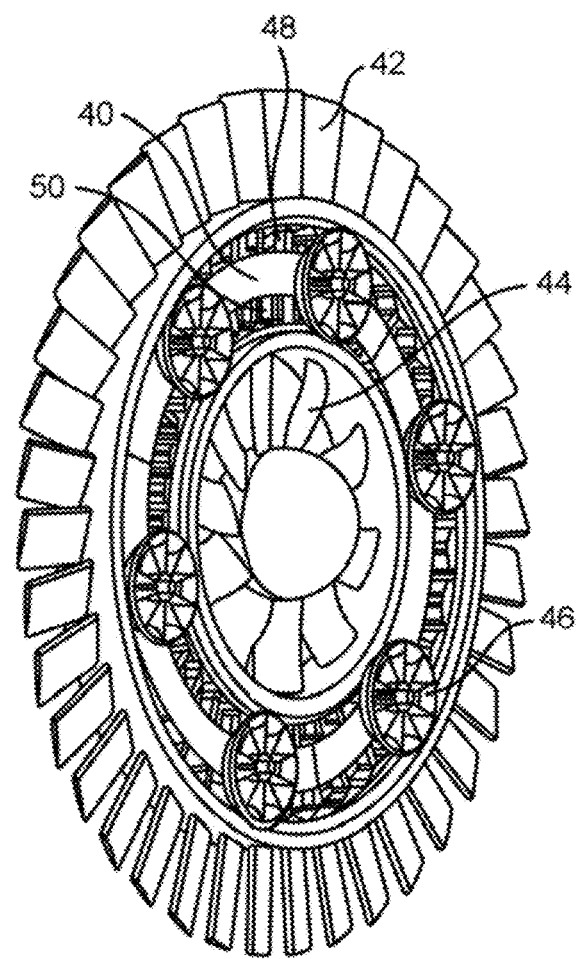
FIG. 5 illustrates a perspective view of a two-section flywheel of an alternate embodiment of an embodiment of the present invention

As described with reference to FIG. 5, in an alternate embodiment, outer and inner flywheel sections 42, 44 move independently of each other either at different speeds or counter rotating if utilized in a fluid that moves in two directions, as an example but not limited to ocean tides. The two flywheel sections are separated by a stator section 40 with tooths wrapped in field coils 48, 50. The central hub contains a magnetic bearing system to support the device.

In an alternate embodiment, the magnetic bearing system used in the device is replaced with more conventional steel or ceramic roller bearings, not shown.

In an alternate embodiment, the gyroscope is hub less and supported by a system of bearings around its perimeter, not shown.

In an alternate embodiment, the flywheel spokes/blades have a fixed cross-section and are constructed from carbon fiber, aluminum, or any suitable material.

In an alternate embodiment, the gyroscope exterior ring can be composed of segmented magnetic materials.

In an alternate embodiment, the blade is pivotably carried at one of its ends around a support shaft. The spokes/blades of the flywheel are constructed from or impregnated with permanent magnets. The outer ring maybe removed if desired.

Figure 6:
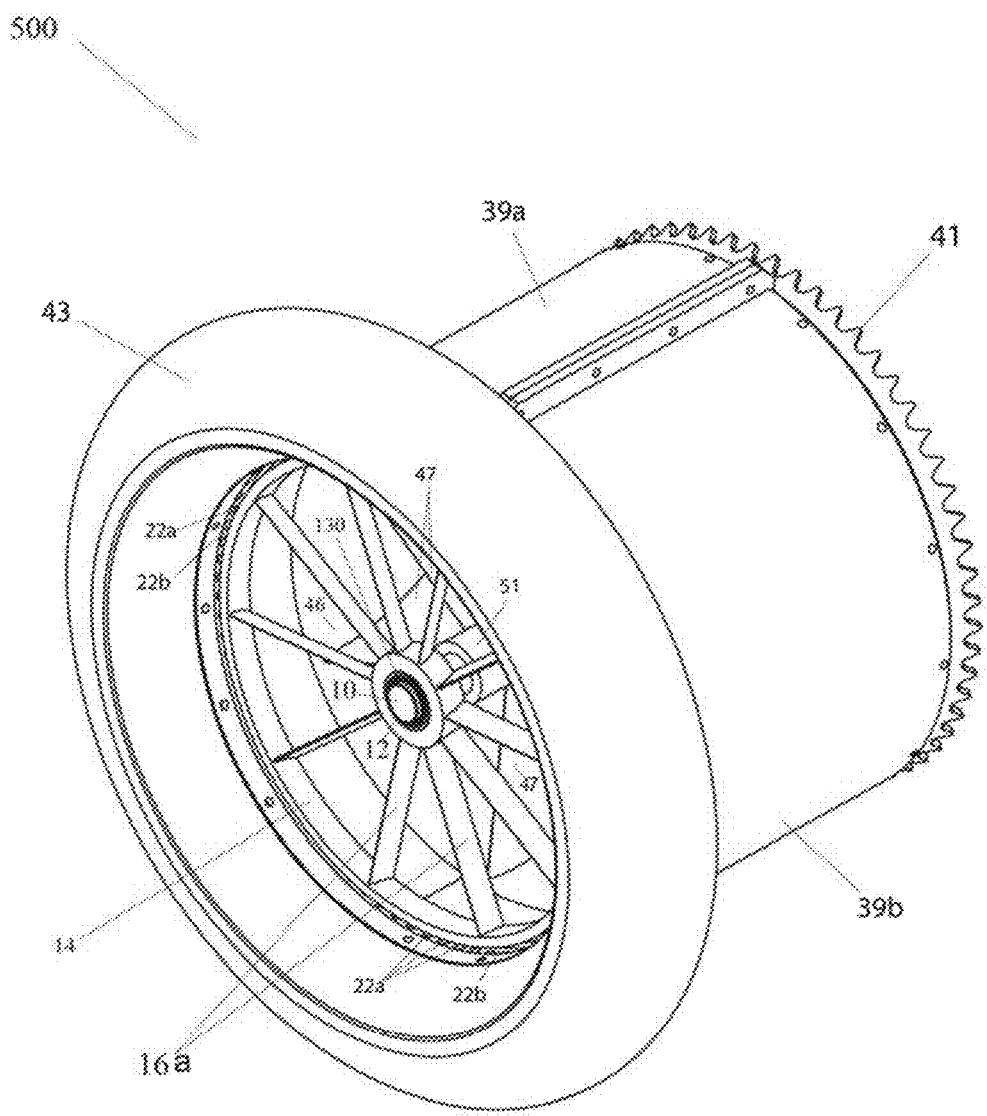
FIG. 6 illustrates a perspective view of an alternate embodiment of the full assembly of the present invention.

As shown with reference to FIG. 6, a friction limiting turbine generator gyroscope 500 includes generator housing composed of a plurality of sections 39a and 39b that may be bolted or otherwise connected. A plurality of ferrous stator rings 22b are attached to the inside of the assembled generator housing sections 39a,39b. The ferrous stator rings 22b support a plurality of stator teeth 22a wrapped by field coils 24, shown in FIG. 15. A plurality of gyroscope flywheel rotor assemblies front rotor 700 (FIG. 12) and rear rotor 900 (FIG. 24) counter rotate within the generator housing sections 39a,39b. The front and rear rotors 700, 900 are preferably composed of composite non-ferrous outer rings 14, central hubs 12, and have a plurality of blades 16a in the front rotor 700 and reverse pitch blades 16b in the rear rotor 900 that extend radially from the hub to the inside of the composite non-ferrous ring. The gyroscopic flywheel rotors 700, 900 rotate freely about centrally located axle 10 utilizing a plurality of vibration reducing passive magnetic bearings 130 that position the rotors both horizontally and vertically with no physical connection between the two rotors. In an alternate embodiment, the vibration reducing magnetic bearings are replaced by conventional thrust ball bearings. The gyroscopic force of the gyroscopic flywheel rotors greatly reduces vibration within the invention.

In low wind conditions, energy is introduced to pre-selected field coils to start rotation of the front and rear rotors 700,900. Once the rotors are rotating, the energy to the field coils may be stopped; the wind keeps the rotors turning with all the field coils producing energy.

If the rotors 700,900 start to rotate faster than desired, energy can be supplied to a pre-determined number of field coils 24 in such a manner as to create a magnetic brake to slow the rotation of the rotors. Once the rotors have returned to a safe speed, the energy going to the field coils is turned off and all the filed coils produce energy again.

Figure 7:
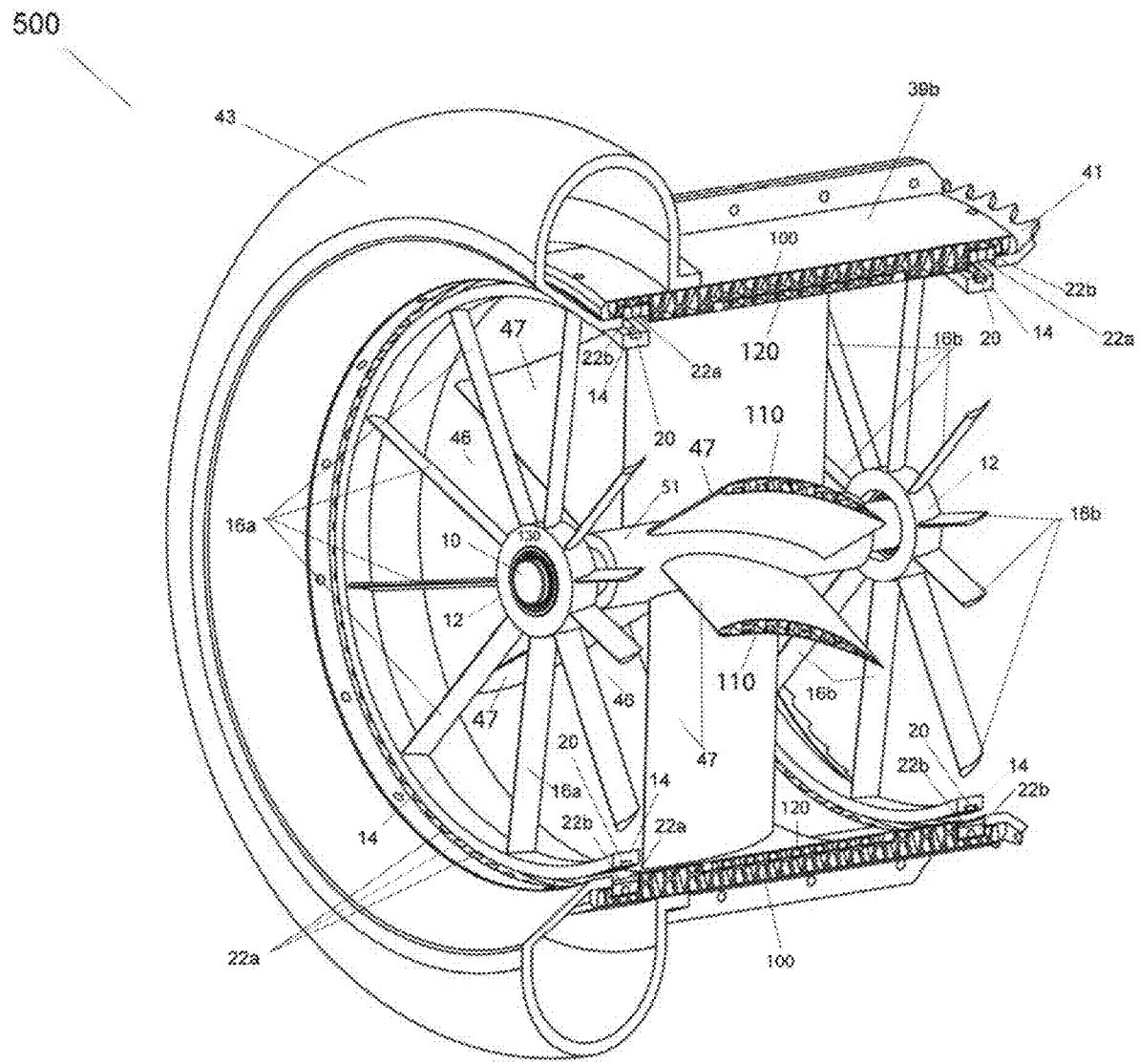
FIG. 7 illustrates an alternate cross-section view of the embodiment of the present invention showing parts of the assembly.
Figure 11:
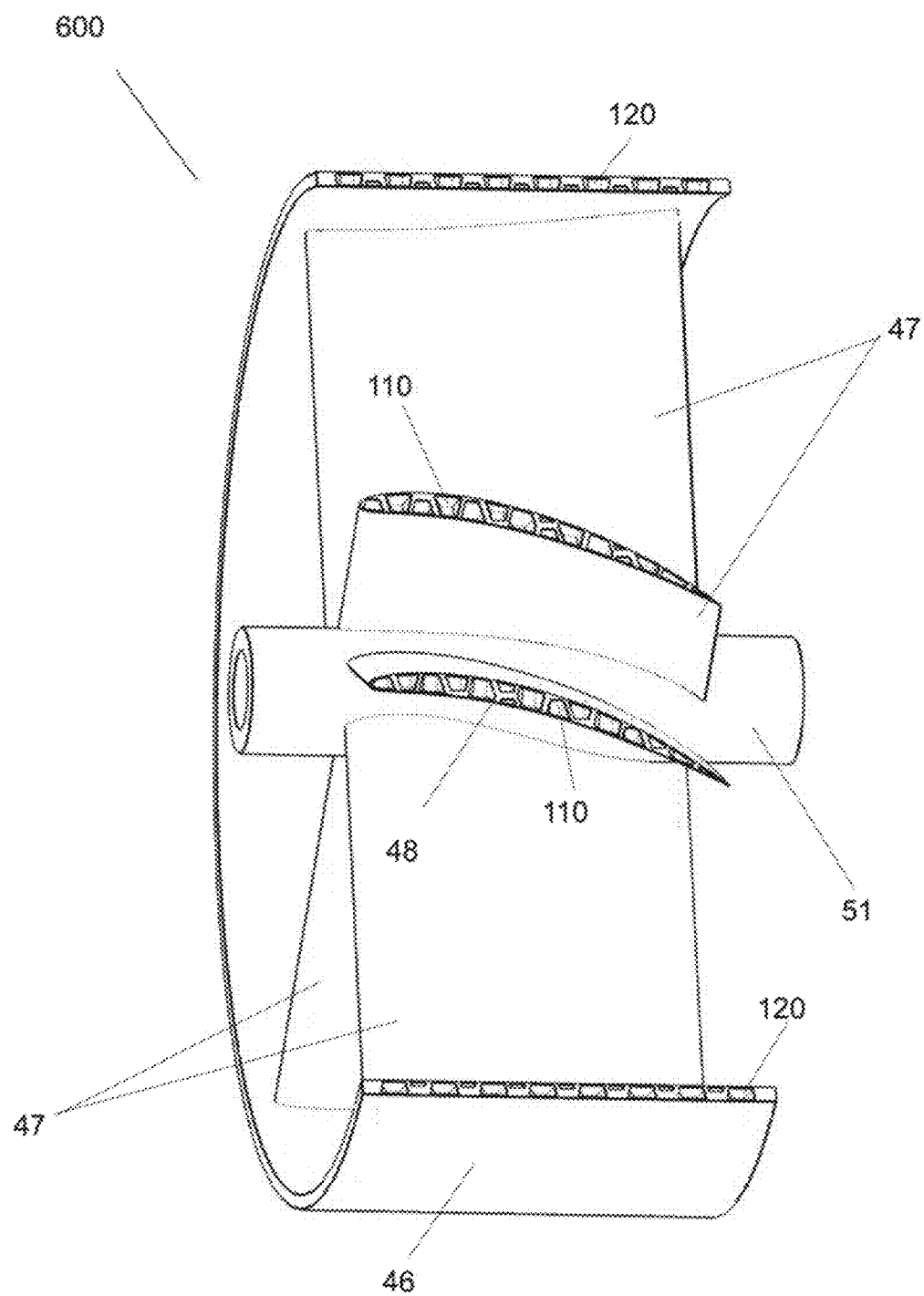
FIG. 11 illustrates a cross section side view of the fan frame assembly of the present invention.
Figure 12:
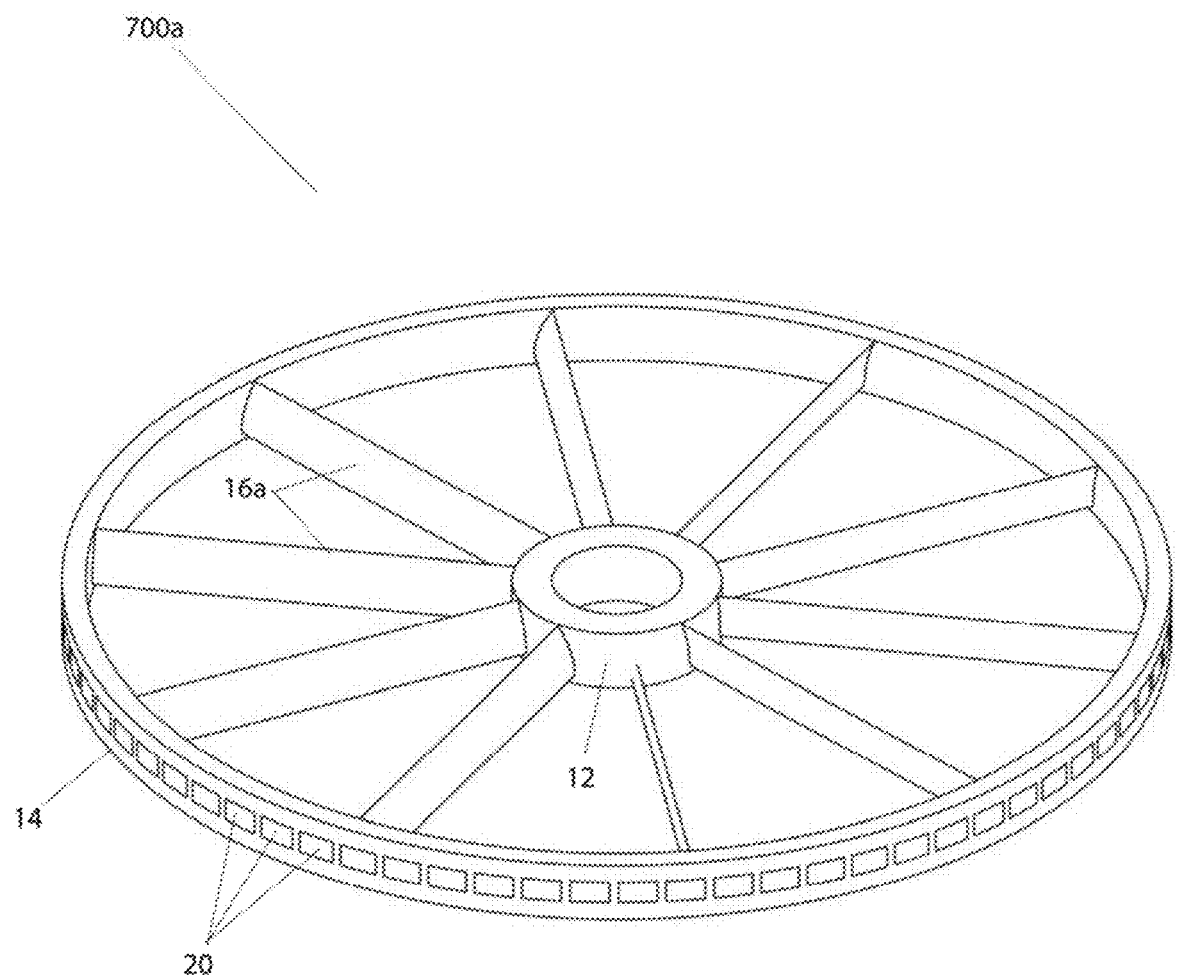
FIG. 12 illustrates a perspective view of the alternative embodiment of the gyroscopic flywheel of the present invention.

As shown with reference to FIGS. 7 and 12, a plurality of non-ferrous rings 14 integrate a plurality of permanent magnet assemblies 20 that rotate within the generator housing section 39a,39b, creating a strong gyroscopic force that dampens vibrations within the turbine generator and acts upon field coils 24 (FIG. 15) located in the generator housing 39a,39b to create energy. Blades 16a in the front rotor 700 and blades 16b in the rear rotor 900 extend radially from a plurality of hubs 12. Blades 16a and 16b may have reverse pitches to allow for counter rotation of the rotors. Unlike conventional blade design that collects most of the wind's energy near the center of the rotors, the rotor blades of the present invention collect a greater percentage of wind energy near their tip with a novel increase in chord at the tips of the blades 16a,16b. To increase air flow through the generator housing, sound deadening rear diffuser 41 is mounted to the rear and incorporates a sound deadening trailing edge. The generator housing 39a.39b integrates an inlet nozzle 43 that compresses incoming air as well as directing turbulent air from any of 360 degrees, for example, when located on top of a building. The inlet nozzle 43 integrates into its design sound and vibration deadening construction. An intermediate duct 56 (FIG. 22) directs air that may not have been captured by the front inlet nozzle 43 into the rear gyroscopic flywheel 900 through penetrations 58 (FIG. 22) at the rear of the generator housing sections 39a,39b. The additional air flow creates greater kinetic energy that can be absorbed by the rear rotor 900, but also helps to clean the air flow eliminating turbulence within the turbine generator gyroscope. A fan frame assembly 600 (FIG. 11) supports an axle 10 that further supports magnetic bearings 130 that may be used by front 700 and rear 900 rotors to facilitate frictionless rotation.

The gyroscopic flywheel rotor blades 16a have a reverse pitch of the rear gyroscope flywheel blades 16b, causing the gyroscope flywheel rotor assemblies to counter rotate. In an alternate embodiment, rotor blades 16a, 16b are magnetically charged with the elimination of the magnetic rings 14.

Figure 8:
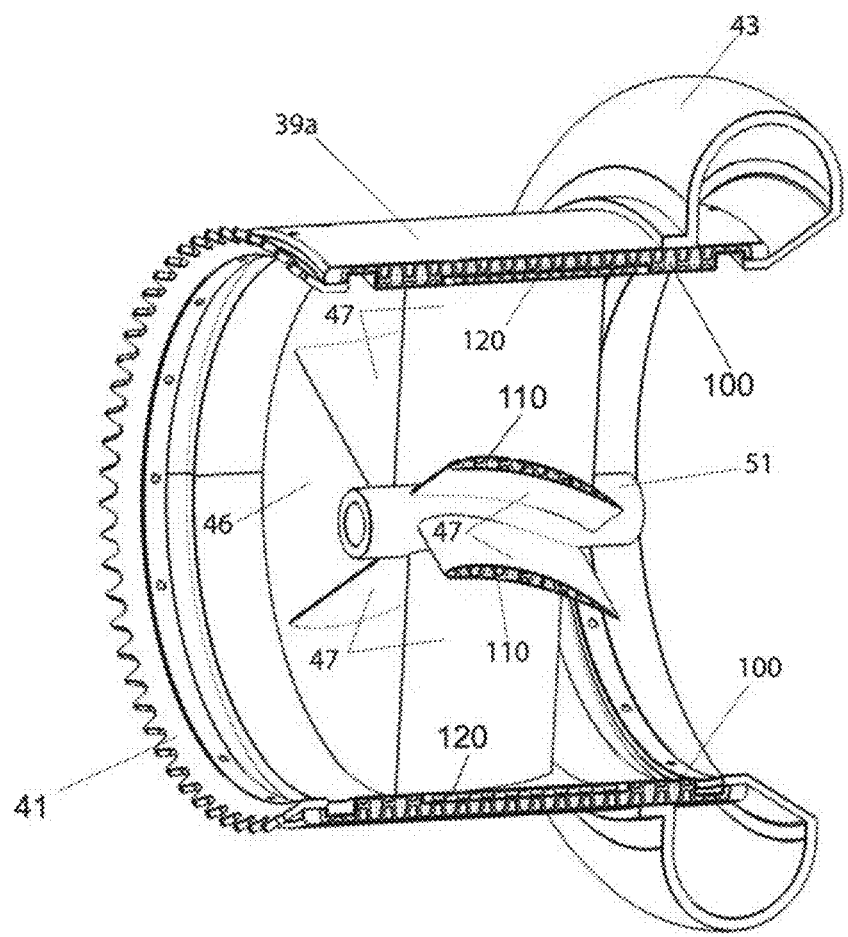
FIG. 8 illustrates a cross-section view of the alternate embodiment of the present invention depicting sound deadening and vibration reducing construction.

As shown with reference to FIG. 8, an embodiment may include a sound deadening and vibration reducing construction. In this embodiment, the generator housing 39a,39b is preferably constructed from a composite carbon fiber skin, aluminum, or other applicable material encasing multiple internal chambers 100 in the structure that are configured to absorb specific frequencies of noise and vibration, as well as provide additional structural rigidity to reduce overall noise transmission from the device. Fan frame vanes 47 may also be constructed from a composite carbon fiber skin, aluminum, or other applicable material encasing multiple internal chambers 110 that are configured to absorb specific frequencies of noise and vibration, as well as provide additional structural rigidity to greatly reduce overall noise transmission from the device. In this embodiment, fan frame outer ring 46 may also be constructed from a composite carbon fiber skin, aluminum, or other applicable material encasing multiple internal chambers 120 that are configured to absorb specific frequencies of noise and vibration, as well as provide additional structural rigidity to greatly reduce overall noise transmission from the device.

Figure 9:
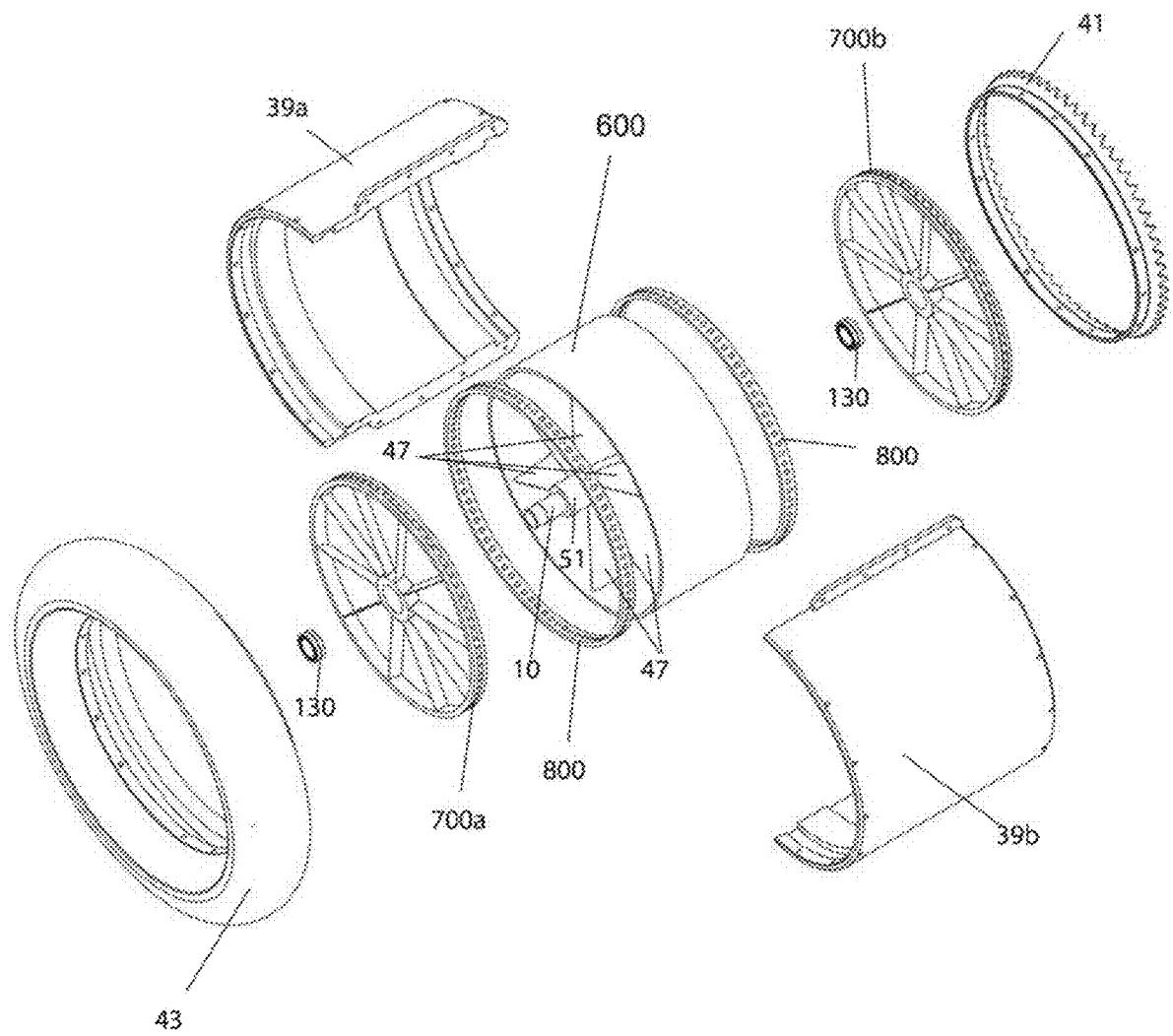
FIG. 9 illustrates an exploded view of the alternate embodiment of the present invention.

As shown with reference to FIG. 9, the generator housing sections 39a,39b house various components of the invention. The fan frame assembly 600 uses internal vanes 47 to direct air as it passes through the from the front gyroscopic rotor 700, focusing the remaining wind energy on the rear counter-rotating gyroscopic flywheel rotor 900. The fan frames hub 51 supports the axle 10, which further supports a plurality of magnetic bearings 130 located at each of its extremities. Each of the magnetic bearings 130 support the counter rotating gyroscopic flywheel rotors 700 located at the front and rotors 900 located at the rear of the device. A plurality of stator assemblies 800 are mounted in the inside surface of the generator housing sections 39a, 39b. The stator assemblies 800 (FIGS. 14, 15) consist of a ferrous ring 22b, stator teeth 22a, and field coils 24. The front inlet nozzle 43 increases the velocity of incoming air from any of 360 degrees as well as reducing turbulence and reducing wind noise. Rear sound deadening diffuser 41 reduces the noise of the air is it exits as well as increasing the velocity of the air as it passes through the invention.

Figure 10:
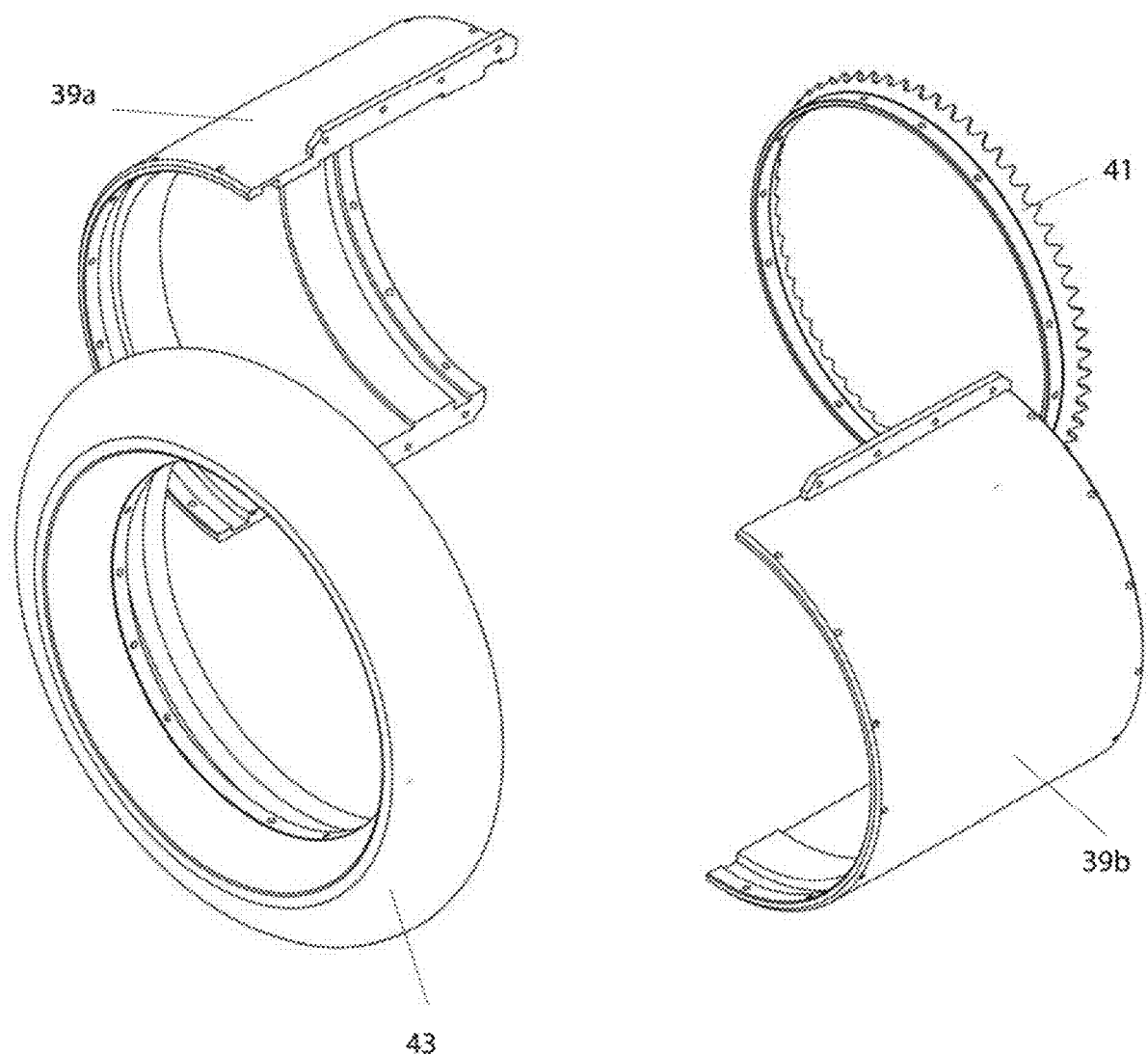
FIG. 10 illustrates an exploded view the generator housing of the alternate embodiment of the present invention.

As shown with reference to FIG. 10, the generator housing 39a,39b is preferably assembled from a plurality of sections to ease manufacturing. The front inlet nozzle 43 is mounted to the front of the generator housing with either mechanical fasteners or adhesives. The sound deadening rear diffuser 41 is attached to the rear of the housing with either mechanical fasteners or adhesives.

As shown with reference to FIG. 11, the fan frame assembly 600 of the present invention may include a plurality of sound deadening air-directing vanes 47 extending radially from hub 51 to outer ring 46. The vanes 47 deaden sound and vibration, preferably being constructed from a composite carbon fiber skin, aluminum, or other applicable material encasing multiple internal chambers 110 that are designed to absorb specific frequencies of noise and vibration greatly reduce overall noise transmission from the device. Similarly, the fan frame outer ring 46 is preferably constructed from a composite carbon fiber skin, aluminum, or other applicable material encasing multiple internal chambers 120, which are designed to absorb specific frequencies of noise and vibration. The fan frame both directs air and adds structural rigidity to the generator.

Figure 13:
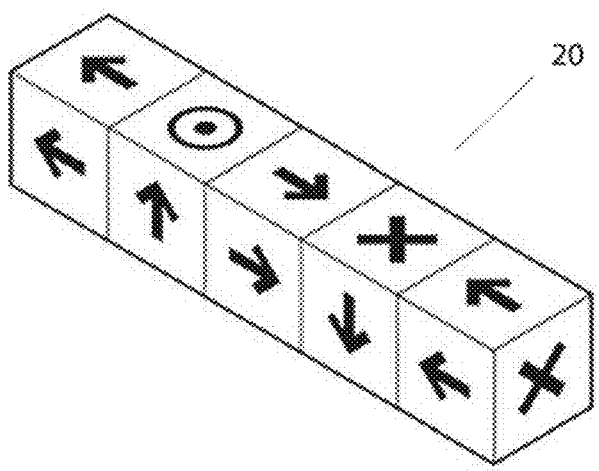
FIG. 13 illustrates a magnet assembly detail of the present invention.

As shown with reference to FIG. 12, an embodiment of the front gyroscopic flywheel 700 of the present invention includes a plurality of blades 16a that extend radially from hub 12 connecting to composite non-ferrous ring 14 at the blade's remote tips. Integrated into the exterior composite non-ferrous ring surface are a plurality of focused directional permanent magnet assemblies 20. As shown further with reference to FIG. 13, the permanent magnet structures 20 preferably include individual magnets with varying pole positions to maximize magnetic force in a singular direction, as depicted in this example.

Figure 14:
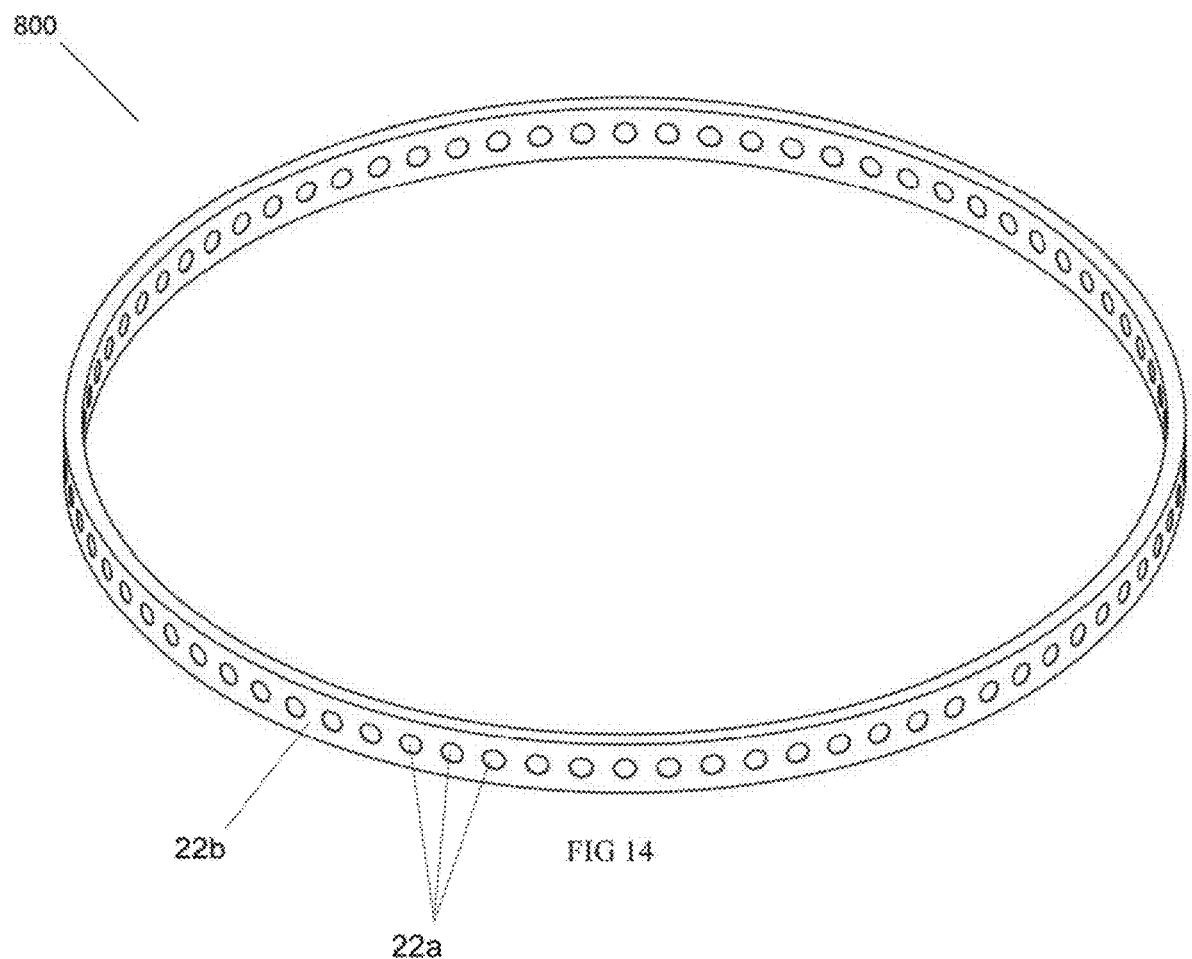
FIG. 14 illustrates a perspective view of the alternative embodiment stator back iron insert with stator tooth inserts of the present.
Figure 15:
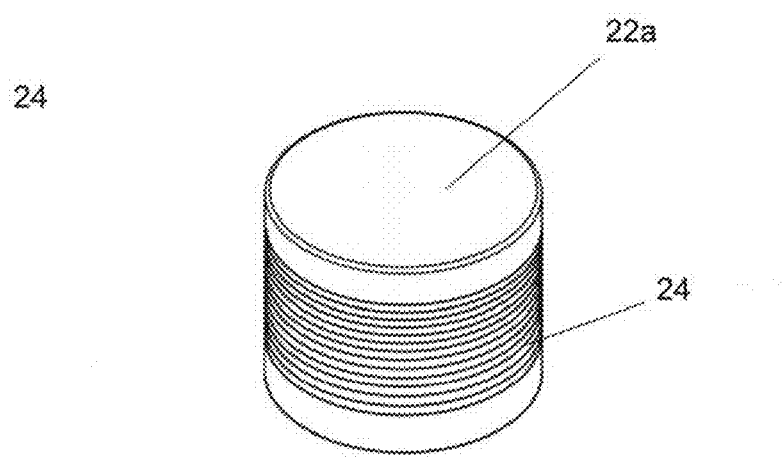
FIG. 15 illustrates a perspective view of a tooth insert assembly of the present invention.

As shown with reference to FIG. 14, the alternative embodiment stator 800 includes the ferrous stator ring 22b, which supports a plurality of stator teeth 22a wrapped with field coils 24 shown more particularly with further reference to FIG. 15. The stator teeth 22a are wrapped by a field coil 24. The field coil 24 may be individually connected to a plurality of voltage regulators allowing them to operate independently from each other. In low energy situations, for example low wind, phasing energy can be sent to a select number of field coils to maintain inertia, which creates a net positive energy production where the friction limiting turbine generator (not shown?) operates like a motor, and may start the rotors spinning during extremely low wind conditions. Energy used to energize the electric field coils to start or maintain rotation can come from battery reserves or an outside source, for example solar cells or other power supply. If the front and rear rotors 700 (FIG. 12), 900 (FIG. 24) spin above a safe level, energy can be introduced back into several of the field coils 24 to act like a brake and slow down the rotation of the rotors from reserve batteries or an outside source.

Figure 16:
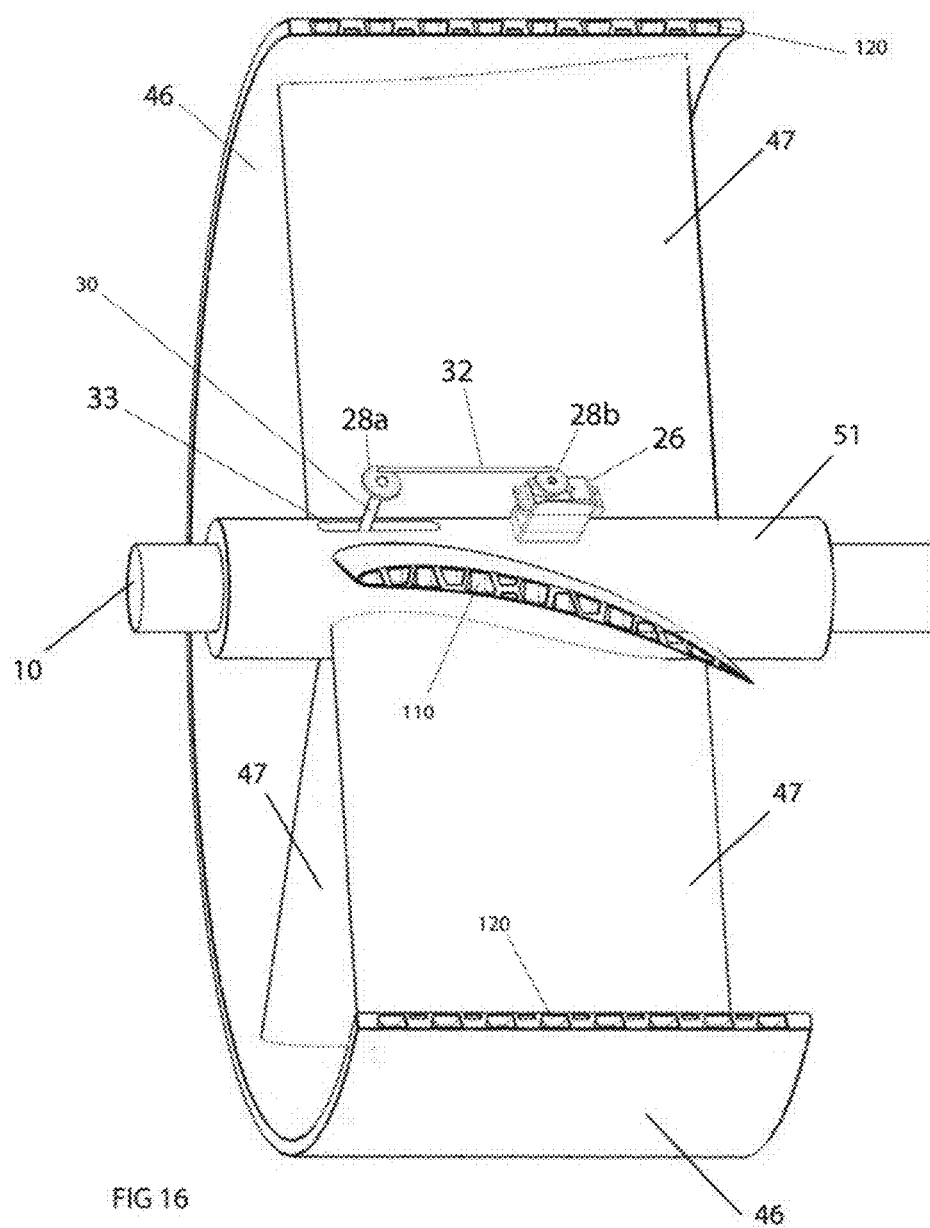
FIG. 16 illustrates a cross-section side view of the alternative embodiment of a servomechanism gyroscopic alignment system of the present invention.
Figure 17:
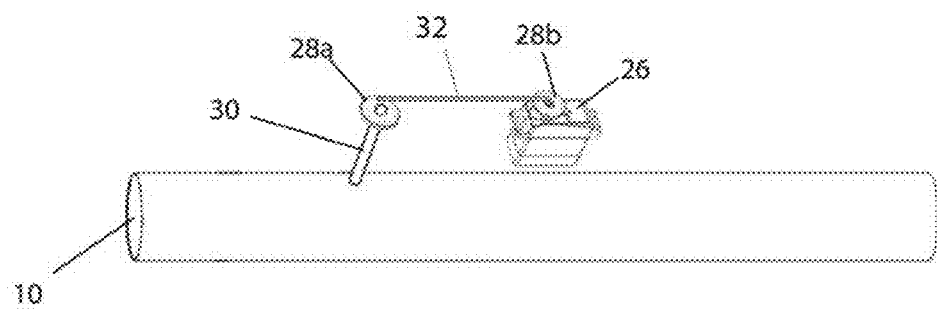
FIG. 17 illustrates a side perspective view of certain components of the servomechanism gyroscopic alignment system of the present invention shown in FIG. 16.

As shown with reference to FIGS. 16 and 17, an embodiment may further include a servomechanism gyroscopic alignment system. Servomechanism 26 adds control of horizontal movement of axle 10. By sliding axle 10 forwards or backwards, the stator assemblies 800 (FIG. 14) and rotor assemblies 700900 are preferably offset, which reduces the wind speed required for operation of the rotating assemblies. A rod 30 is integrated into the axle 10 and may extend through the fan frame hub 51 via a penetration opening 33. Linkage between the servomechanism 26 and the rod 30 consists of control arms 28a fixed to the end of the rod 30 and control arm 28b of the servomechanism 26, which are connected by a pushrod 32.

Figure 18:
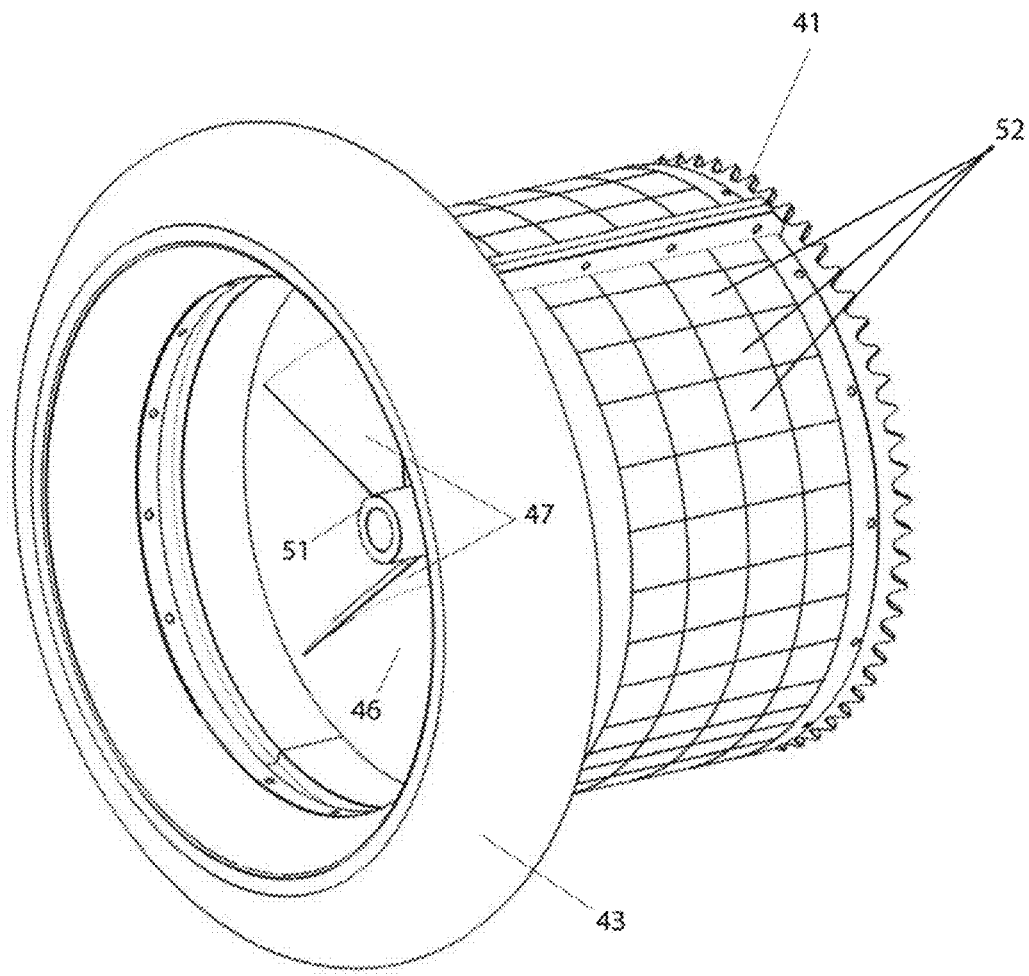
FIG. 18 illustrates a perspective view of the alternate embodiment of the present invention showing integrated solar cells in it outer skin.

As shown with reference to FIG. 18, the present invention may include solar cells integrated into its outer skin. In this embodiment, a plurality of solar cells 52 are integrated into the skin of the generator housing with their power either adding to the power output of the friction limiting turbine generator gyroscope 500 (FIG. 6) or used in any applicable sub-assemblies that might be utilized in its operation. These preferably are positioned external to the generator housing section 39a, 39b, and between the inlet nozzle 43 located at the front of the device and sound deadening diffuser 41 located at the rear of the device.

Figure 19:
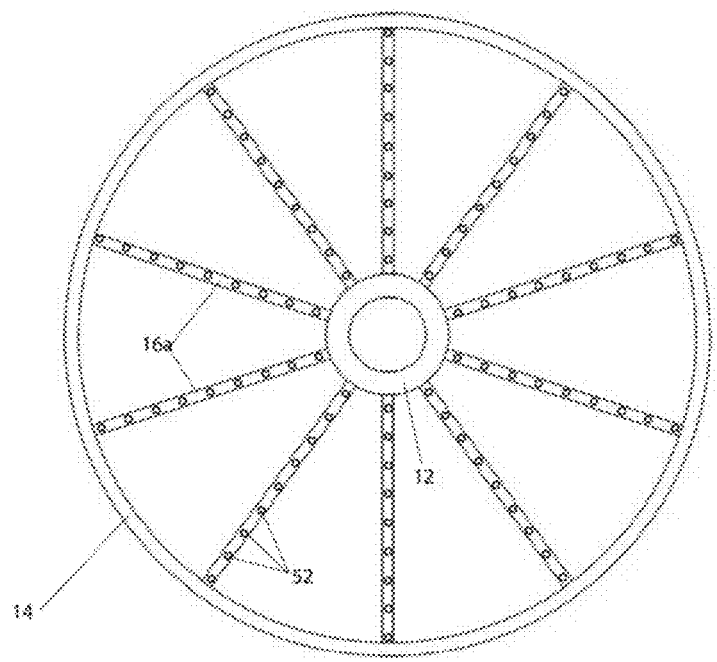
FIG. 19 illustrates a front view of the alternate embodiment of the present invention showing light emitting diodes for holographic image creation.
Figure 20:
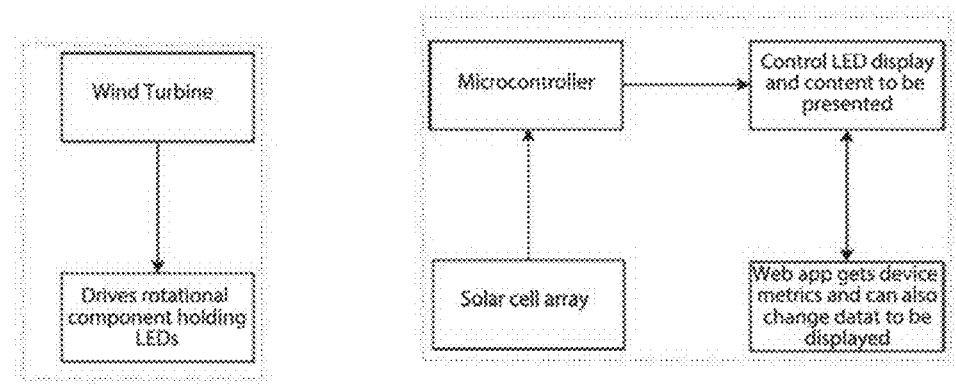
FIG. 20 illustrates a block diagram of the electronic assemblies that may be used to create holographic images when the alternate embodiment of the present invention is operating.

As shown with reference to FIGS. 19 and 20, an alternative embodiment may incorporate light emitting diodes (LED) 52, or similar multi-frequency light creating bulbs, preferably integrated into the front of the blades 16a (FIG. 12) and/or the rear of the blades 16b (FIG. 24), extending radially from hub 12, whose tips connect to the inner diameter of rotor rings 14. The LED's may be controlled by a microcontroller (not shown), and be configured to create holographic images when the rotor 16a front and 16b rotate, for example to create display advertising or other messages. An example block diagram of the electronic assemblies that may be used to create holographic images during operation is shown more particularly with reference to FIG. 20. The block diagram also depicts potential energy sources to power the LEDs 52 and microcontroller.

Figure 4:
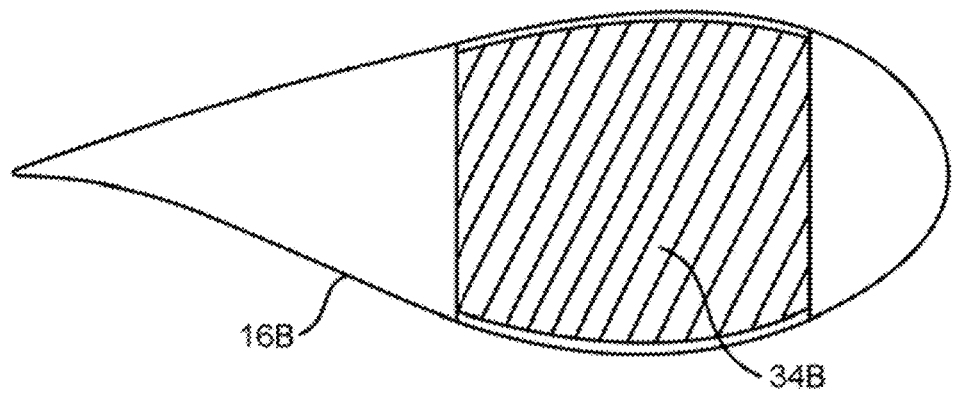
FIG. 4 presents a cross-section of the flywheel blades with a large cross-section with an expanded spar of an embodiment of the present invention.
Figure 21:
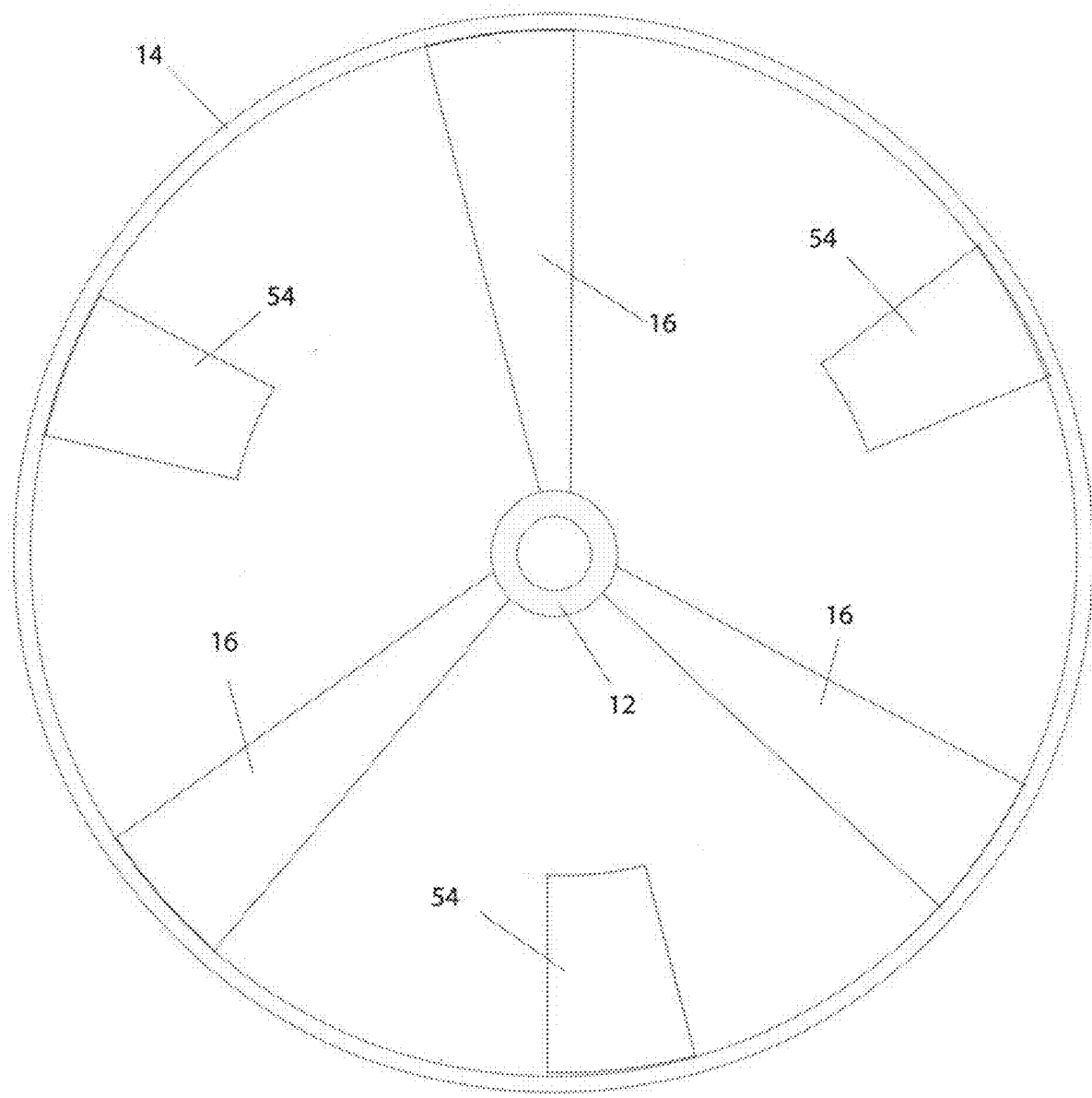
FIG. 21 illustrates an alternative embodiment of the gyroscopic flywheel rotors with additional stub blades.

As shown with reference to FIG. 21, an alternative embodiment of the present invention may include a plurality of perimeter stub rotor blades 54 in addition to rotor blades 16a front rotor, 16b rear rotor which add to the efficiency through increased torque at a wide range of wind speeds. The specific shape and design of the rotor blades 16a, 16b and stub rotor blades 54 may be customized and optimized for specific environment applications, and may differ from each other. The blades pitch can be adjusted by a servomechanism (not shown). In an alternate embodiment blades 16a and 16b cross section may also be changed, for example as seen in FIGS. 3 and 4. A central spar 34A and 34B hat contains shaped memory alloys that allows the spar to change its shape from a thin cross cross-section 34A to a thicker cross cross-section 34B to take advantage of variable speeds and densities of the fluids that pass over the spokes/ blades. The skin's shaped memory alloys work in conjunction with the spar to maintain the desired airfoil. A computer monitoring device (not shown) may be includes to monitor the incoming fluid and adjusts the spokes/blade cross section to extract the maximum amount energy kinetic energy as it passes through the blades. The field coils 24 (FIG. 15) may have different windings and diameters to maximize efficiency and by location.

Figure 22:
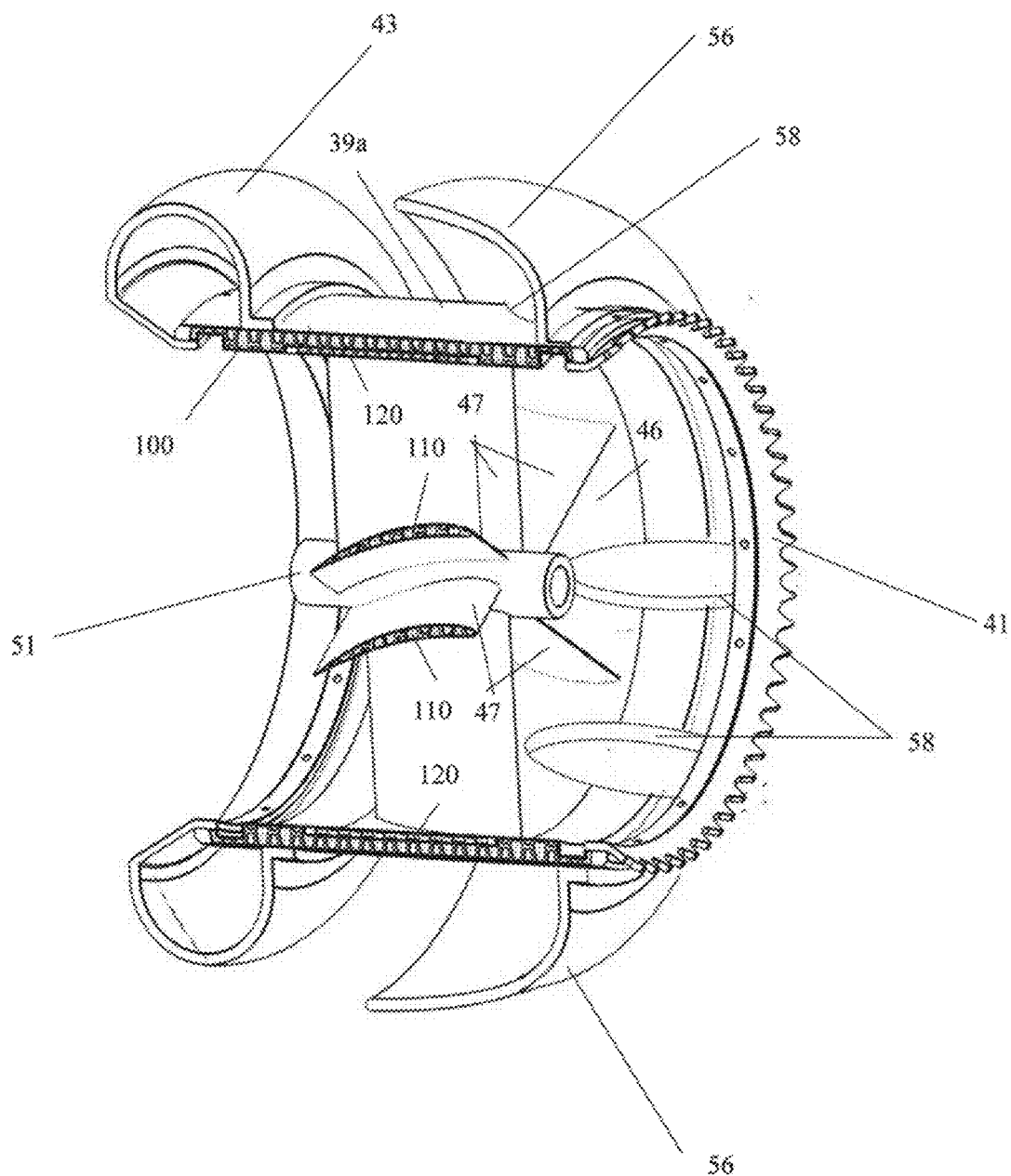
FIG. 22 illustrates a cross-section view of an alternate embodiment of the present invention depicting a second inlet duct for rear rotor.

As shown with reference FIG. 22, which illustrates an alternate embodiment of the present invention depicting a second inlet duct for rear rotor, the generator housing sections 39a,39b install a secondary inlet nozzle 56 behind inlet nozzle 43 that guides air into a plurality of penetrations 58, which compresses additional air forcing it into the second counter rotating gyroscopic flywheel rotor for higher efficiency.

Figure 23:
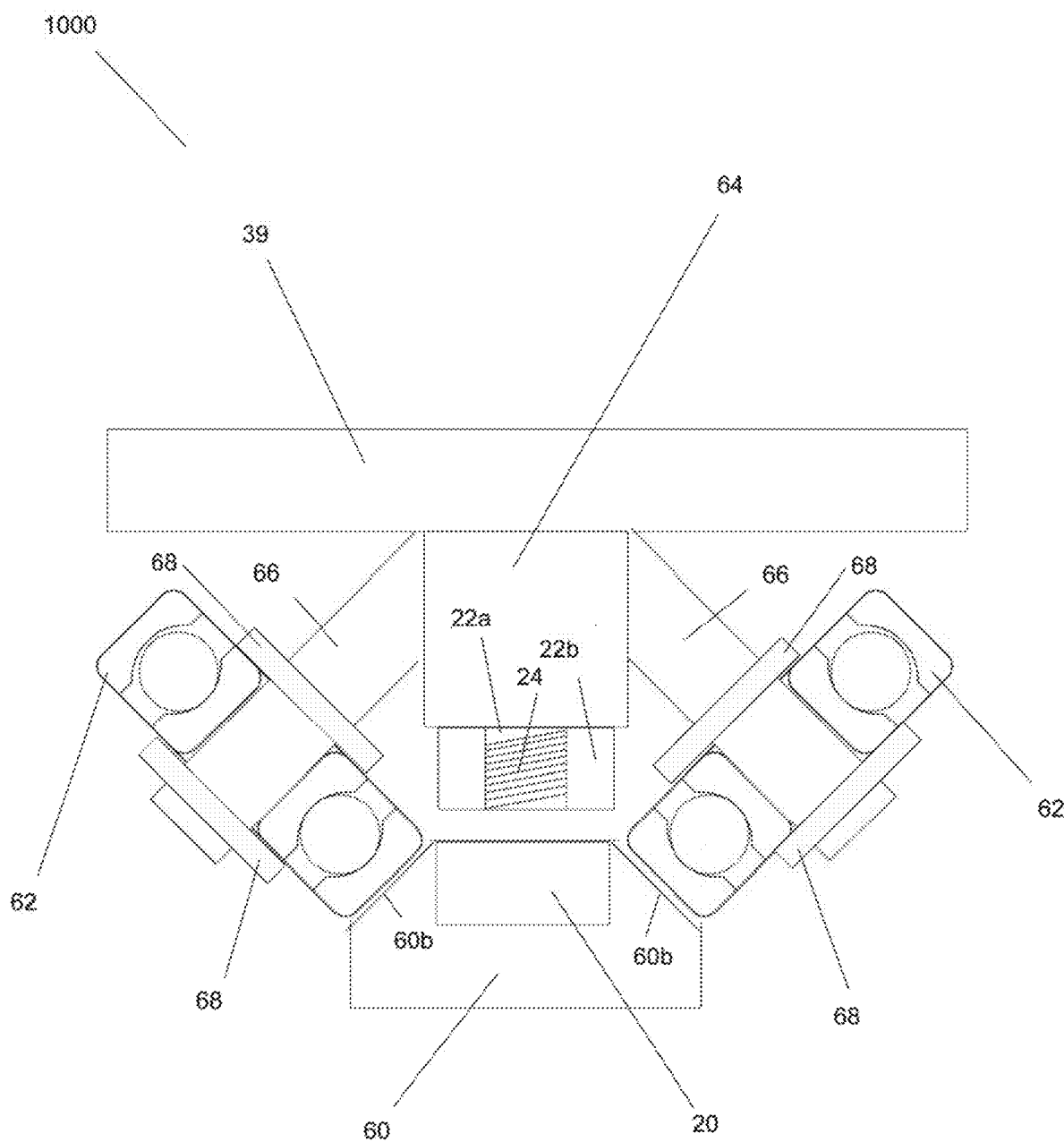
FIG. 23 illustrates a cross-section view of an alternate embodiment of an outer bearing assembly.
Figure 24:
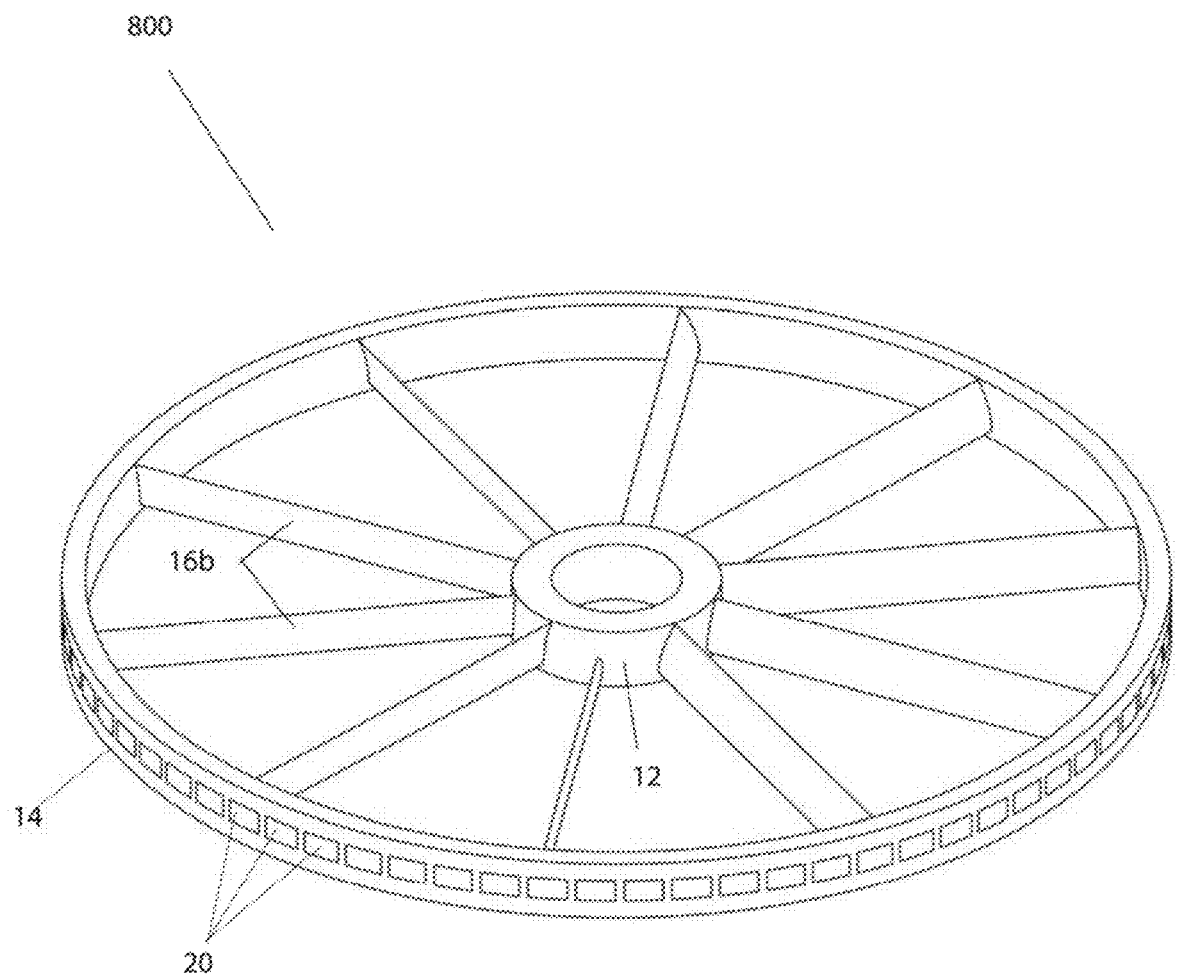
FIG. 24 illustrates a perspective view of the alternative embodiment of the gyroscopic flywheel of the present invention, with a different blade pitch than that shown in FIG. 12.

As shown with reference FIG. 23, which illustrates a cross-section view of an alternate embodiment of an outer bearing assembly 1000. By supporting rotors 700, 900 from their perimeter composite non-ferrous rings 14 in a plurality of radial locations rather than from their hubs 12, the efficiency of the turbine generator gyroscope 500 may be increased. Composite non-ferrous ring 60, which add a plurality of bearing surfaces 60b, may replace composite non-ferrous rings 14 on the front rotor 700 (FIG. 12) and non-ferrous ring 14 of the rear rotor 900 (FIG. 24). A plurality of non-ferrous roller bearing 62 constructed from ceramic or other applicable materials are supported by roller bearing surface 60b. The ferrous stator ring 24b is supported by non-ferrous rectangular cross-section separator 64. Non-ferrous roller bearings are supported by non-ferrous circular cross-section separator 66. Bearing 62 is supported by circlips 68 restricting its movement. The addition of the outer ring bearing assembly removes the need for axle 10 and magnetic bearings 130. The fan frame assembly 600 (FIG. 11) remains to direct air into the rear rotor 900. In an alternate embodiment, the roller bearing 62 is replaced by a passive magnetic bearing (not shown)

As shown with reference to FIG. 24, an embodiment of the rear gyroscopic flywheel 900 of the present invention includes a plurality of blades 16b that have a reverse pitch from blades 16a of assembly 700 (FIG. 12) that extend radially from hub 12 connecting to the inner surface of composite non-ferrous ring 14. Integrated into the exterior surface of the composite non-ferrous rings 14 are a plurality of focused directional permanent magnet assemblies 20.

In an alternate embodiment, the fan frame 600 (FIG. 11) is removed entirely when integrating the outer bearing assembly 1000.

In an alternate embodiment, the operation of the permanent magnets 20 (FIGS. 12, 13) of the gyroscope flywheel ring 14 may be replaced by magnetizing the gyroscope flywheel blades 16a,16b with magnetic field generating materials (not shown), including powders, beads, woven cloth or any applicable material whose magnetic poles are oriented for the most efficient operation of the generator.

In an alternate embodiment, any number of gyroscope flywheels can be installed and rotate in a manner that is most efficient in absorbing incoming wind energy.

In an alternate embodiment, a single regulator receives energy from all field coils.

In an alternate embodiment only a single gyroscope flywheel is used in the device.

The present invention is preferably mounted to a stable structural mount that allows the wind turbine to rotate freely in line with the wind direction or directed by servomechanism to a desired direction (not shown).

While one or more embodiments of the invention have been illustrated and described above, many changes can be made without departing from the spirit and scope of the invention. Accordingly, the scope of the invention is not limited by the disclosure of specific embodiment. Instead, the invention should be determined entirely by reference to the claims that follow.

The embodiments of the invention in which an exclusive property or privilege is claimed are defined as follows:

1. An electric energy creating turbine gyroscope, comprising:
    a plurality of counter rotating rotors with reverse pitch blades on a central rotatably hub, wherein at least one blade is comprised of shaped memory alloy, wherein a shape and a cross section of the at least one blade are configured to be adjusted based on an application of electric current;
    a perimeter ring surrounding the plurality of blades and configured to rotate with the hub;
    a plurality of directional permanent magnet assemblies integrated into the perimeter ring;
    a sound-deadening enclosure surrounding the perimeter ring, the enclosure including a plurality of field coils, wherein the plurality of field coils is connected to a servomechanism by a control arm, wherein a distance of the plurality of field coils from the plurality of directional permanent magnet assemblies is adjustable for optimized energy generation in one or more environmental conditions; and
    a computer device configured to monitor and adjust the shape and the cross section of the plurality of blades to maximize the extracted energy.

2. The gyroscope of claim 1, wherein each blade has a leading edge and a trailing edge defining a surface for receiving wind.

3. The gyroscope of claim 1, further comprising a nose cone covering rotor hubs, which cone is configured to transfer an air mass approaching the gyroscope to be directed around the hubs and into the plurality of blades.

4. The gyroscope of claim 1, wherein the magnets integrated in the ring stabilize the gyroscope.

5. The gyroscope of claim 1, further comprising an aerodynamically shaped duct configured to direct air through the plurality of counter rotating rotors.

6. The gyroscope of claim 5, further comprising a second duct configured to direct air through the plurality of counter rotating rotors.

7. The gyroscope of claim 1, wherein the plurality of field coils create energy when interacting with the plurality of directional permanent magnet assemblies integrated into the perimeter ring, wherein the plurality of field coils is individually connected to a plurality of voltage regulators, wherein the plurality of field coils operate independently, wherein a phasing electrical current is applied to a selected number of the plurality of field coils to initiate a rotation of the plurality of counter rotating rotors.

8. The gyroscope of claim 7, further comprising a power source configured to initiate rotation of at least one of the plurality of counter rotating rotors.

9. The gyroscope of claim 7, further comprising a power source configured to slow rotation of at least one of the plurality of counter rotating rotors.

10. The gyroscope of claim 1, wherein the enclosure surrounding the perimeter ring and integrated magnets incorporate a sound deadening diffuser.

11. The gyroscope of claim 1, further comprising a plurality of light emitting diodes incorporated into at least one of the plurality of blades mounted on the central rotatable hub.

12. The gyroscope of claim 9, wherein the plurality of light emitting diodes are configured to create a holographic image.

13. The gyroscope of claim 1, wherein the enclosure surrounding the perimeter ring and integrated magnets incorporates at least one solar cells configured to generate energy.

14. The gyroscope of claim 1, further comprising a plurality of inlet nozzle directing air to the plurality of counter rotating rotors.

15. The gyroscope of claim 1, wherein at least one of the plurality of counter rotating rotors is supported at its perimeter by at least one non-ferrous roller bearing.

16. The gyroscope of claim 1, wherein at least one of the plurality of counter rotating rotors is supported at its perimeter by at least one passive magnet bearing.

17. The gyroscope of claim 1, wherein at least one of the blades of the plurality of counter rotating rotors is magnetically charged.

\* \* \* \* \*